US012027755B2

(12) United States Patent
Cheng et al.

(10) Patent No.: US 12,027,755 B2
(45) Date of Patent: Jul. 2, 2024

(54) WIRELESS DATA TERMINAL AND WIRELESS DATA TERMINAL CONTROL SYSTEM

(71) Applicant: Huawei Technologies Co., Ltd., Shenzhen (CN)

(72) Inventors: Liangjun Cheng, Wuhan (CN); Bogui Ye, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 172 days.

(21) Appl. No.: 17/793,315

(22) PCT Filed: Jan. 6, 2021

(86) PCT No.: PCT/CN2021/070510
§ 371 (c)(1),
(2) Date: Jul. 15, 2022

(87) PCT Pub. No.: WO2021/143600
PCT Pub. Date: Jul. 22, 2021

(65) Prior Publication Data
US 2023/0047107 A1 Feb. 16, 2023

(30) Foreign Application Priority Data
Jan. 17, 2020 (CN) ......................... 202010055641.2

(51) Int. Cl.
*H01Q 1/22* (2006.01)
*H01Q 1/08* (2006.01)
(Continued)

(52) U.S. Cl.
CPC ............. *H01Q 1/2291* (2013.01); *H01Q 1/08* (2013.01); *H01Q 5/307* (2015.01); *H01Q 21/20* (2013.01); *H01Q 21/205* (2013.01); *H01Q 21/28* (2013.01)

(58) Field of Classification Search
CPC ........ H01Q 1/08; H01Q 1/2291; H01Q 1/246; H01Q 5/307; H01Q 21/20; H01Q 21/28; H01Q 21/205
See application file for complete search history.

(56) References Cited

U.S. PATENT DOCUMENTS 6,100,855 A 8/2000 Vinson et al.
2012/0076116 A1* 3/2012 O'Connor ................ H01Q 1/08 343/702
(Continued)

FOREIGN PATENT DOCUMENTS

CN 202917626 U 5/2013
CN 109617823 A 4/2019
(Continued)

*Primary Examiner* — Hoang V Nguyen
*Assistant Examiner* — Amal Patel
(74) *Attorney, Agent, or Firm* — Leydig, Voit & Mayer, Ltd.

(57) ABSTRACT

This application provides a wireless data terminal and a wireless data terminal control system. The wireless data terminal includes a housing, a drive assembly, a first antenna assembly, and a second antenna assembly. The drive assembly can drive the first antenna assembly and the second antenna assembly to extend or retract to move in different directions between a first location and a second location. When the wireless data terminal does not need to be used or high isolation between antennas is not required, the drive assembly may drive the antenna assembly to retract to the first location, so that a volume occupied by the wireless data terminal can be reduced while an antenna isolation requirement is met. When high isolation between the antennas is required, the drive assembly may drive the antenna assembly to extend to the second location, so that isolation between the antennas is increased.

20 Claims, 16 Drawing Sheets

(51) Int. Cl.

| | |
|---|---|
| ***H01Q 5/307*** | (2015.01) |
| ***H01Q 21/20*** | (2006.01) |
| ***H01Q 21/28*** | (2006.01) |

(56) References Cited

U.S. PATENT DOCUMENTS

| | | | | |
|---|---|---|---|---|
| 2013/0009834 | A1 | 1/2013 | Hefele et al. | |
| 2013/0178181 | A1* | 7/2013 | Pohlabeln .............. | H01Q 1/242 455/226.1 |
| 2015/0256213 | A1* | 9/2015 | Jan ........................ | H01Q 21/205 370/338 |

FOREIGN PATENT DOCUMENTS

| | | | | |
|---|---|---|---|---|
| CN | 110416699 | A | 11/2019 | |
| CN | 110416700 | A | 11/2019 | |
| CN | 110416730 | A | 11/2019 | |
| CN | 110417946 | A | 11/2019 | |
| CN | 110492225 | A | 11/2019 | |
| CN | 110649369 | A | 1/2020 | |
| CN | 211957889 | U | 11/2020 | |
| WO | WO-2013152664 | A1 * | 10/2013 | ............. G01S 19/14 |

* cited by examiner

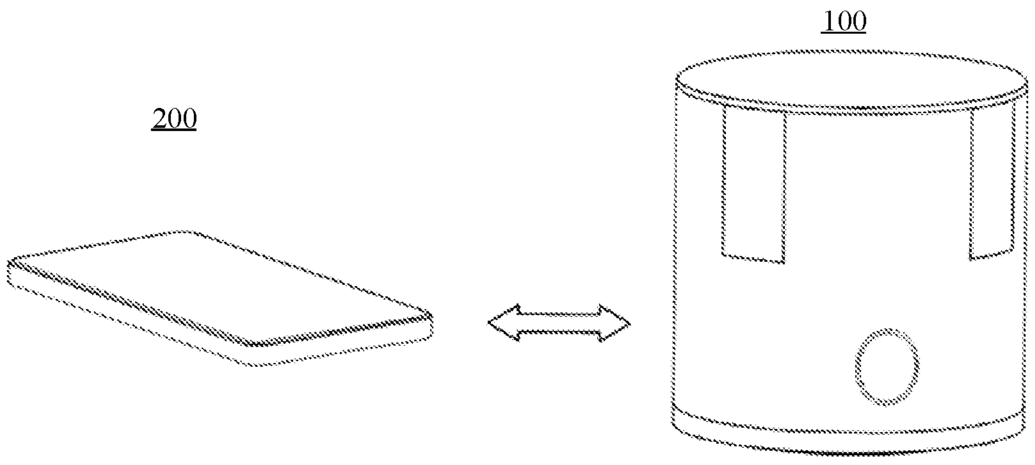

FIG. 15

S1: Control an operation interface of an application, where a terminal processor sends a control signal through a transceiver in response to an operation instruction of a user

↓

S2: A radiator of a wireless data terminal receives the control signal and transmits the control signal to a radio frequency front-end circuit

↓

S3: The radio frequency front-end circuit processes the control signal and transmits the control signal to a processor of the wireless data terminal

↓

S4: The processor sends a control instruction to a drive assembly in response to the control signal

↓

S5: The drive assembly drives, in response to the control instruction, an antenna assembly to extend or retract relative to a housing

FIG. 16

WIRELESS DATA TERMINAL AND WIRELESS DATA TERMINAL CONTROL SYSTEM

This application is a National Stage of International Application No. PCT/CN2021/070510 filed on Jan. 6, 2021, which claims priority to Chinese Patent Application No. 202010055641.2 filed on Jan. 17, 2020. Both of the aforementioned applications are hereby incorporated by reference in their entireties.

TECHNICAL FIELD

This application relates to the field of electronic device technologies, and in particular, to a wireless data terminal and a wireless data terminal control system.

BACKGROUND

A wireless data terminal may be usually a terminal in a form of a data card such as a Bluetooth adapter, a user end device such as a router or a telephone, or a wireless terminal such as a mobile phone or a tablet. The wireless data terminal usually includes a plurality of antennas, and a distance between the plurality of antennas is fixed. Therefore, isolation between the antennas (that is, a ratio of transmit power of one of the plurality of antennas to receive power of another antenna in the plurality of antennas) is fixed, and is applicable only to a single application scenario.

SUMMARY

This application provides a wireless data terminal. Antenna isolation of the wireless data terminal is variable, so that the wireless data terminal is applicable to different application scenarios.

According to a first aspect, this application provides a wireless data terminal. The wireless data terminal includes a housing, a drive assembly, a first antenna assembly, and a second antenna assembly. The drive assembly is accommodated in the housing, the drive assembly is configured to drive the first antenna assembly and the second antenna assembly to extend or retract to move in different directions between a first location and a second location, the first location is a location at which the antenna assembly retracts relative to the housing to a maximum extent, and the second location is a location at which the antenna assembly extends out of the housing to a maximum extent. The first antenna assembly includes a first radiator, the second antenna assembly includes a second radiator, the first radiator and the second radiator are configured to transmit a radio frequency signal, and a distance between the first radiator and the second radiator at the first location is less than a distance between the first radiator and the second radiator at the second location.

The drive assembly drives the first antenna assembly and the second antenna assembly to extend or retract to move in the different directions between the first location and the second location, that is, the drive assembly can drive the first antenna assembly and the second antenna assembly to retract in the housing or extend out of the housing. When the wireless data terminal does not need to be used or high isolation between antennas is not required (e.g., a small signal coverage area is required), the first antenna assembly and the second antenna assembly may be driven to retract in the housing, so that a volume occupied by the wireless data terminal can be reduced, and the wireless data terminal can have a good appearance effect. When high isolation between the antennas is required (e.g., a large signal coverage area is required), the first antenna assembly and the second antenna assembly may be driven to extend out of the housing in different directions. In this case, a distance between the first radiator of the first antenna assembly and the second radiator of the second antenna assembly is greater than a distance obtained when the first antenna assembly and the second antenna assembly retract in the housing, so that isolation between the antennas is increased. According to the wireless data terminal in this application, a distance between the first antenna assembly and the second antenna assembly is adjustable, so that isolation between antennas can be adjusted based on an actual application scenario, and an antenna isolation requirement is met.

In some implementations, an operating frequency band of the first antenna assembly is different from an operating frequency band of the second antenna assembly. There are at least two first antenna assemblies. A center of a pattern formed by connecting projections of the at least two first antenna assemblies on a reference plane is a first center, the first center is located on a central axis of the housing, and an included angle $\alpha_1$ formed between connection lines between the first center and projections of two adjacent first antenna assemblies on the reference plane satisfies a relation: $\alpha_1=360°/N$, where N is a quantity of first antenna assemblies. The reference plane is perpendicular to the central axis of the housing.

Coupling is more likely to occur between first antenna assemblies that have a same operating frequency band, affecting isolation between antennas. In this application, the included angle $\alpha_1$ formed between the connection lines between the first center and the projections of the two adjacent first antenna assemblies on the reference plane satisfies the relation: $\alpha_1=360°/N$. That is, when there are two first antenna assemblies, the two first antenna assemblies are symmetrically disposed relative to the central axis of the housing; and when there are three or more first antenna assemblies, the first antenna assemblies are disposed at equal distances. This can ensure that a distance between any two adjacent first antenna assemblies can be longest, to improve isolation between antennas as much as possible.

In some implementations, there are at least two second antenna assemblies. A center of a pattern formed by connecting projections of the at least two second antenna assemblies on the reference plane is a second center, the second center is located on the central axis of the housing, and an included angle $\alpha^2$ formed between connection lines between the second center and projections of two adjacent second antenna assemblies on the reference plane satisfies a relation: $\alpha_2=360°/M$, where M is a quantity of second antenna assemblies.

Because operating frequency bands of the second antenna assemblies are the same, coupling is more likely to occur between the second antenna assemblies that have the same operating frequency band, affecting isolation between antennas. In this application, the included angle $\alpha_2$ formed between the connection lines between the second center and the projections of the two adjacent second antenna assemblies on the reference plane satisfies the relation: $\alpha_2=360°/M$. That is, when there are two second antenna assemblies, the two second antenna assemblies are symmetrically disposed relative to the central axis of the housing; and when there are three or more second antenna assemblies, the second antenna assemblies are disposed at equal distances. This can ensure that a distance between any two adjacent second antenna assemblies can be longest, to improve isolation between antennas as much as possible.

In some implementations, in the wireless data terminal, the quantity of first antenna assemblies is the same as the quantity of second antenna assemblies, the first antenna assemblies and the second antenna assemblies are alternately disposed, and distances from any first antenna assembly to two adjacent second antenna assemblies are the same. This avoids isolation caused by an excessively short distance between a first antenna assembly and an adjacent second antenna assembly.

In an implementation of this application, the quantity of first antenna assemblies and the quantity of second antenna assemblies are both two, the two first antenna assemblies are symmetrically disposed relative to the central axis of the housing, the two second antenna assemblies are symmetrically disposed relative to the central axis of the housing, and a connection line between the two first antenna assemblies is perpendicular to a connection line between the two second antenna assemblies. That is, the included angle $\alpha_1$ formed between the connection lines between the first center and the projections of the two first antenna assemblies on the reference plane satisfies the relation: $\alpha_1$=360°/N, and isolation between the two first antenna assemblies is highest. The included angle $\alpha_2$ formed between the connection lines between the second center and the projections of the two second antenna assemblies on the reference plane satisfies the relation: $\alpha_2$=360°/M, and isolation between the two second antenna assemblies is highest. In addition, the distances from the first antenna assembly to the two adjacent second antenna assemblies are the same. This avoids isolation caused by an excessively short distance between a first antenna assembly and an adjacent second antenna assembly.

In some implementations, the housing includes a tubular main housing, a plurality of through holes are disposed on the main housing, the plurality of through holes are arranged at intervals along a circumferential direction of the main housing, and each through hole is connected to an inner side and an outer side of the main housing. The drive assembly is located on the inner side of the main housing, and the drive assembly is configured to drive the first antenna assembly and the second antenna assembly to extend or retract relative to each other through the plurality of through holes in a one-to-one correspondence manner.

The through holes are arranged at intervals along the circumferential direction of the main housing, and the first antenna assembly and the second antenna assembly extend or retract relative to each other through the plurality of through holes in a one-to-one correspondence manner. Therefore, an extending or retracting direction of each of the first antenna assembly and the second antenna assembly is limited to only a direction from a location on the central axis of the main housing to each through hole, to ensure that the first antenna assembly and the second antenna assembly extend or retract in different directions.

In some implementations, the drive assembly includes a motor, a gear, and a plurality of racks, one end of each rack is fastened to the first antenna assembly or the second antenna assembly, different racks are engaged with different locations on the gear, the different racks have different extension directions, and an extension direction of the rack is a direction from an end that is of the rack and that is away from the first antenna assembly or the second antenna assembly to an end that is of the rack and that is connected to the first antenna assembly or the second antenna assembly.

The motor, the gear, and the racks are used to control extending or retracting of the first antenna assembly and the second antenna assembly, and the plurality of racks are engaged with the same gear, so that one gear rotates to simultaneously control extending or retracting of the plurality of antenna assemblies connected to the racks. Therefore, a control structure is simple. In addition, there is no need to separately control the antenna assemblies to sequentially extend or retract relative to the housing, so that a control process can be simplified and control efficiency can be improved.

In some implementations, the drive assembly includes a plurality of motors, a plurality of gears, and a plurality of racks, each motor is connected to at least one gear, each gear is engaged with and connected to at least one rack, one end of each rack is fastened to the first antenna assembly or the second antenna assembly, different racks have different extension directions, and an extension direction of the rack is a direction from an end that is of the rack and that is away from the first antenna assembly or the second antenna assembly to an end that is of the rack and that is connected to the first antenna assembly or the second antenna assembly.

Different motors, different gears, and different racks are used to separately control extending or retracting of the first antenna assemblies and the second antenna assemblies, so that extending or retracting of a corresponding first antenna assembly or a corresponding second antenna assembly can be controlled as required.

In some implementations, the drive assembly includes a plurality of first magnetic attraction components and a plurality of second magnetic attraction components that are in a one-to-one correspondence with the plurality of first magnetic attraction components, each second magnetic attraction component is fastened to one end that is of the first antenna assembly or the second antenna assembly and that is away from an outer side of the housing, and the first magnetic attraction component is located on a side that is of a corresponding second magnetic attraction component and that is away from the outer side of the housing. The first magnetic attraction component includes a first state and a second state, and when the first magnetic attraction component is in the first state, the first magnetic attraction component attracts the corresponding second magnetic attraction component; or when the first magnetic attraction component is in the second state, the first magnetic attraction component repels the corresponding second magnetic attraction component.

The first magnetic attraction component and the second magnetic attraction component attract and repel each other, to implement extending or retracting of the first antenna assembly and the second antenna assembly. Therefore, a structure is simple, and energy consumption is low.

In some implementations, the first antenna assembly includes a first antenna bracket and a first antenna body, the first radiator is disposed on the first antenna body, and the first antenna body is mounted on a side that is of the first antenna bracket and that is away from the central axis of the housing. The second antenna assembly includes a second antenna bracket and a second antenna body, the second radiator is disposed on the second antenna body, and the second antenna body is mounted on a side that is of the second antenna bracket and that is away from the central axis of the housing.

The first antenna body is mounted on the side that is of the first antenna bracket and that is away from the central axis of the housing, so that a distance between the first antenna body on which the first radiator is disposed and the central axis of the housing is longest. Therefore, a distance between first antenna bodies of a plurality of first antenna assemblies can be longest, and a distance between first radiators can be increased as much as possible without changing a size of the wireless data terminal, to increase isolation between antennas corresponding to the first radiators. The second antenna body is mounted on the side that is of the second antenna bracket and that is away from the central axis of the housing, so that a distance between the second antenna body on which the second radiator is disposed and the central axis of the housing is longest. Therefore, a distance between second antenna bodies of a plurality of second antenna assemblies can be longest, so that a distance between second radiators can be increased as much as possible without changing the size of the wireless data terminal, to improve isolation between antennas corresponding to the second radiators.

In some implementations, both the first antenna body and the second antenna body are parallel to the central axis of the housing. When the wireless data terminal is placed on a horizontal bearing table, the central axis of the housing is usually located on a vertical plane perpendicular to the horizontal bearing table. In this case, the first antenna body and the second antenna body are also located on the vertical plane, to ensure that the antenna can have a better antenna radiation range.

In some implementations, the first antenna assembly further includes a first antenna housing, and both the first antenna bracket and the first antenna body are accommodated in the first antenna housing. The first antenna housing includes a first bottom wall and a first side wall disposed around an edge of the first bottom wall, and when the first antenna assembly is located at the first location, an outer surface of the first bottom wall and an outer surface of the housing are coplanar. In this case, the wireless data terminal has a good appearance effect. The second antenna assembly further includes a second antenna housing, and both the second antenna bracket and the second antenna body are accommodated in the second antenna housing. The second antenna housing includes a second bottom wall and a second side wall disposed around an edge of the second bottom wall, and when the second antenna assembly is located at the first location, an outer surface of the second bottom wall and the outer surface of the housing are coplanar. In this case, the wireless data terminal has a good appearance effect.

In some implementations, the wireless data terminal further includes a mainboard and a feeder. The mainboard includes a radio frequency front-end circuit, and the feeder is electrically connected to the radio frequency front-end circuit and the radiator of the antenna. A fastener is disposed in each of the first antenna bracket and the second antenna bracket, and the fastener is configured to fasten the feeder to the first antenna bracket or the second antenna bracket, to ensure that when the feeder is pulled in an extending or retracting process of the antenna assembly, a location at which the feeder is connected to the first radiator or the second radiator remains stable, to avoid a problem that the connection between the feeder and the first radiator or the second radiator is broken due to pulling of the feeder.

In some implementations, the wireless data terminal further includes a bearing bracket, the bearing bracket is accommodated in the housing, and the drive assembly, the first antenna assembly, and the second antenna assembly are all disposed on the bearing bracket. The bearing bracket includes a plurality of grooves, the plurality of grooves are in a one-to-one correspondence with the first antenna assemblies and the second antenna assemblies, an extension direction of the groove is the same as a movement direction of a corresponding first antenna assembly or a corresponding second antenna assembly, and the extension direction of the groove is a direction from an end that is of the groove and that is away from an outer side of the housing to an end that is of the groove and that is close to the outer side of the housing. The first antenna assembly and the second antenna assembly are at least partially accommodated in the groove and extend or retract along the groove.

Because the extension direction of the groove is the same as the movement direction of the corresponding first antenna assembly or the corresponding second antenna assembly, when the first antenna assembly or the second antenna assembly extends or retracts, the first antenna assembly or the second antenna assembly can at least partially move along the extension direction of the groove, to ensure that a movement process of the first antenna assembly or the second antenna assembly is stable.

In some implementations, the wireless data terminal further includes a processor and a radio frequency front-end circuit. Both the radio frequency front-end circuit and the drive assembly are connected to the processor. The radio frequency front-end circuit is connected to the first radiator and the second radiator. The first radiator and the second radiator are configured to: receive a control signal and transmit the control signal to the radio frequency front-end circuit. The radio frequency front-end circuit is configured to: process the control signal and transmit the control signal to the processor. The processor is configured to send a control instruction to the drive assembly in response to the control signal. The drive assembly is configured to drive, in response to the control instruction, the first antenna assembly and the second antenna assembly to extend or retract relative to the housing. In this implementation, the wireless data terminal can implement extending or retracting of the first antenna assembly and the second antenna assembly in response to the control signal, so that extending or retracting of the first antenna assembly and the second antenna assembly of the wireless data terminal can be remotely controlled.

According to a second aspect, this application provides a wireless data terminal control system. The wireless data terminal control system includes a control terminal and the foregoing wireless data terminal. The control terminal includes a terminal processor and a transceiver. The terminal processor is connected to the transceiver. The terminal processor is configured to send the control signal through the transceiver in response to an operation instruction of a user. In this implementation of this application, the user can control extending or retracting of the first antenna assembly and the second antenna assembly of the wireless data terminal by using the control terminal, to implement control of extending or retracting of the first antenna assembly and the second antenna assembly of the wireless data terminal in a simple and convenient manner.

BRIEF DESCRIPTION OF DRAWINGS

FIG. 15 is a schematic diagram of structures of functional modules of a control terminal;

FIG. 16 is a flowchart of a control method of a wireless data terminal;

DESCRIPTION OF EMBODIMENTS

The following describes implementations of this application with reference to the accompanying drawings in implementations of this application.

This application provides a wireless data terminal. The wireless data terminal is configured to provide a data service, to implement communication between the device and another device, or serves as a transit station of another device, to implement communication between devices. The wireless data terminal may be a mobile phone, a telephone, a router, or the like. In this application, an example in which the wireless data terminal is a router is used for description.

Figure 1:
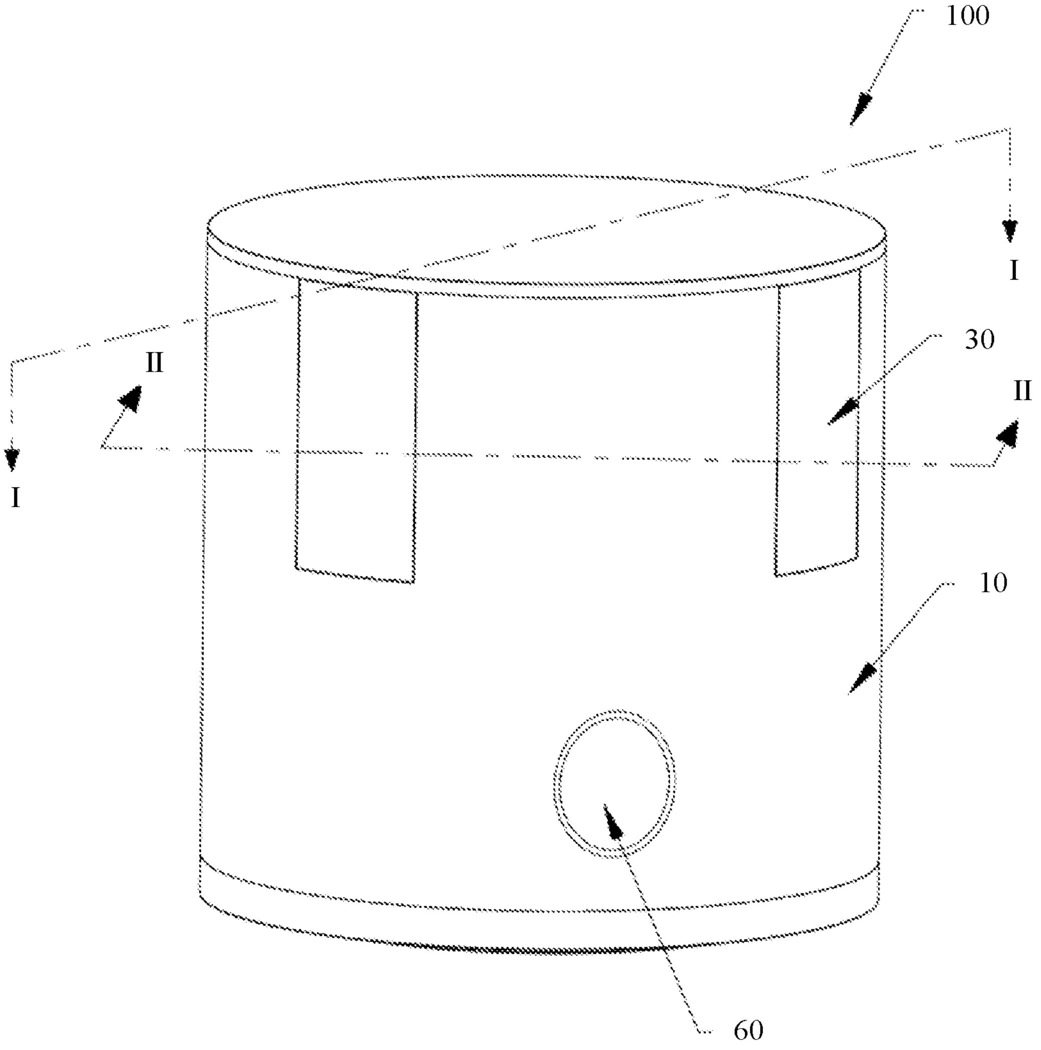
FIG. 1 is a schematic diagram of a structure in which a wireless data terminal is in a first state according to an implementation of this application.
Figure 2:
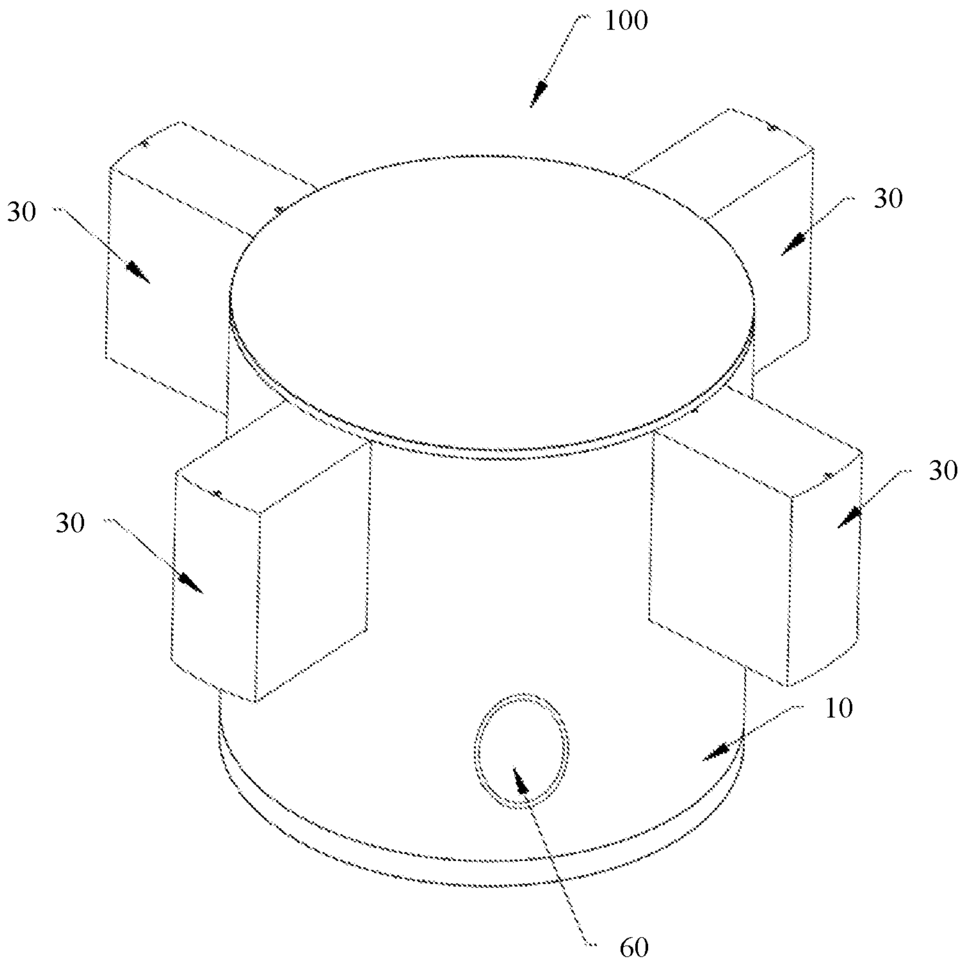
FIG. 2 is a schematic diagram of a structure in which the wireless data terminal in the implementation shown in FIG. 1 is in a second state.

FIG. 1 is a schematic diagram of a structure in which a wireless data terminal 100 is in a first state according to an implementation of this application. FIG. 2 is a schematic diagram of a structure in which the wireless data terminal 100 in the implementation shown in FIG. 1 is in a second state. The wireless data terminal 100 is a router. The wireless data terminal 100 includes a plurality of antennas. Each antenna includes a radiator, and a radio frequency signal is transmitted by using the radiator. The wireless data terminal 100 includes a housing 10 and a plurality of antenna assemblies 30. The plurality of antenna assemblies 30 include at least one first antenna assembly and at least one second antenna assembly. An operating frequency band of the first antenna assembly may be the same as or different from an operating frequency band of the second antenna assembly. Each antenna assembly 30 includes a radiator, and the radiator is configured to transmit a radio frequency signal. The first antenna assembly includes a first radiator, and the second antenna assembly includes a second radiator. The antenna assembly 30 can extend or retract to move between a first location and a second location, so that the antenna assembly 30 retracts in the housing 10, partially extends out of the housing 10, or completely extends out of the housing 10.

When the wireless data terminal 100 is in the first state, the antenna assembly 30 is located at the first location. In this case, the antenna assembly 30 retracts relative to the housing 10 to a maximum extent. In this case, a surface that is of the antenna assembly 30 and that faces an outer side of the housing 10 and an outer surface of the housing 10 are coplanar. It should be noted that "a surface that is of the antenna assembly 30 and that faces an outer side of the housing 10 and an outer surface of the housing 10 are coplanar" described herein is not necessarily precise coplanar, and there may be a little error. Alternatively, that the surface that is of the antenna assembly 30 and that faces the outer side of the housing 10 slightly recesses on the outer surface of the housing 10 may be considered as that the surface that is of the antenna assembly 30 and that faces the outer side of the housing 10 and the outer surface of the housing 10 are coplanar. Alternatively, that the surface that is of the antenna assembly 30 and that faces the outer side of the housing 10 slightly extends from the outer surface of the housing 10 may be considered as that the surface that is of the antenna assembly 30 and that faces the outer side of the housing 10 and the outer surface of the housing 10 are coplanar. When the antenna assembly 30 is located at the first location, the antenna assembly 30 does not obviously extend from a structure of the housing 10 or does not obviously recess in a groove of the housing 10, so that the surface that is of the antenna assembly 30 and that faces the outer side of the housing 10 and the outer surface of the housing 10 are coplanar to provide a good appearance. The first state may be a state in which the wireless data terminal 100 is not used, or may be a state in which a radio frequency signal of the wireless data terminal 100 does not need to be very strong and can meet a use requirement. For example, when the radio frequency signal of the wireless data terminal 100 needs to cover a small area and radio frequency signal strength at an edge location in the covered area can still meet the requirement, the wireless data terminal 100 may be in the first state.

When the wireless data terminal 100 is in the second state, the antenna assembly 30 is located at the second location. In this case, the antenna assembly 30 extends out of the housing 10 to a maximum extent. The second state may be a state in which a radio frequency signal of the wireless data terminal 100 needs to cover a large area, and radio frequency signal strength of the wireless data terminal 100 needs to be strong.

A distance formed between the radiators when the plurality of antenna assemblies 30 are located at the first location relative to the housing 10 is less than a distance formed between the radiators when the plurality of antenna assemblies 30 are located at the second location relative to the housing 10. Therefore, the antenna assembly 30 extends or retracts relative to the housing 10, to adjust a distance between the antenna assemblies 30, and adjust the distance between the radiators of the antenna assemblies 30, to adjust isolation between antennas corresponding to the radiators, so that wireless communication performance of the wireless data terminal 100 is improved. For example, when a radio frequency signal of the wireless data terminal 100 needs to cover a large area, radio frequency signal strength of the wireless data terminal 100 needs to be strong. Therefore, isolation between the plurality of antennas of the wireless data terminal 100 is required to be high. In this case, the antenna assembly 30 may be driven to extend out of the housing 10, so that the wireless data terminal 100 is in the second state. In this case, the distance between the radiators is increased as the antenna assembly 30 extends out of the housing, so that isolation between the antennas is increased and an antenna isolation requirement is met. The antenna isolation refers to a ratio of transmit power of one antenna to receive power of another antenna. For example, transmit power of an antenna corresponding to the first radiator is P1. The second radiator is coupled to the first radiator to partially receive a signal transmitted by the antenna corresponding to the first radiator, where receive power is P2. In this case, isolation between the antenna corresponding to the first radiator and an antenna corresponding to the second radiator is P1/P2. To reduce impact on signal transmission between antennas, increasingly higher isolation is required. Increasing a distance between radiators of the antennas usually can increase isolation between the antennas.

It may be understood that, in some implementations, based on an actual application scenario and different requirements of isolation between the antennas, an extending length of the antenna assembly 30 relative to the housing 10 may be adjusted as required, that is, the distance between the radiators is adjusted, so that a requirement of isolation between the antennas is met and a volume occupied by the wireless data terminal 100 is reduced as much as possible. In some implementations, only some of the plurality of antenna assemblies 30 may be driven to extend or retract, to change isolation between the some antenna assemblies 30 and other antenna assemblies 30. For example, in the plurality of antenna assemblies 30, only the first antenna assembly and the second antenna assembly extend or retract relative to the housing 10, and a distance between the first radiator and the second radiator at the first location is less than a distance between the first radiator and the second radiator at the second location. Isolation between the first antenna assembly and the second antenna assembly can be adjusted by adjusting an extending or retracting state of the first antenna assembly and an extending or retracting state of the second antenna assembly. It should be noted that the isolation between the antenna assemblies 30 in this application is isolation between antennas corresponding to the radiators included in the antenna assemblies 30. For example, the isolation between the first antenna assembly and the second antenna assembly is isolation between an antenna corresponding to the first radiator and an antenna corresponding to the second radiator.

In this application, a state of the wireless data terminal 100 can be changed based on an actual application scenario, to ensure that when the wireless data terminal 100 is used in various application scenarios, high isolation can be achieved between the antenna assemblies 30, and the wireless data terminal 100 can have good performance. In addition, it can be ensured that a volume occupied by the wireless data terminal 100 can be reduced as much as possible while a requirement of isolation between the antenna assemblies 30 of the wireless data terminal 100 is met. When the wireless data terminal 100 is in the first state, the wireless data terminal 100 can further have a good appearance effect.

Figure 3:
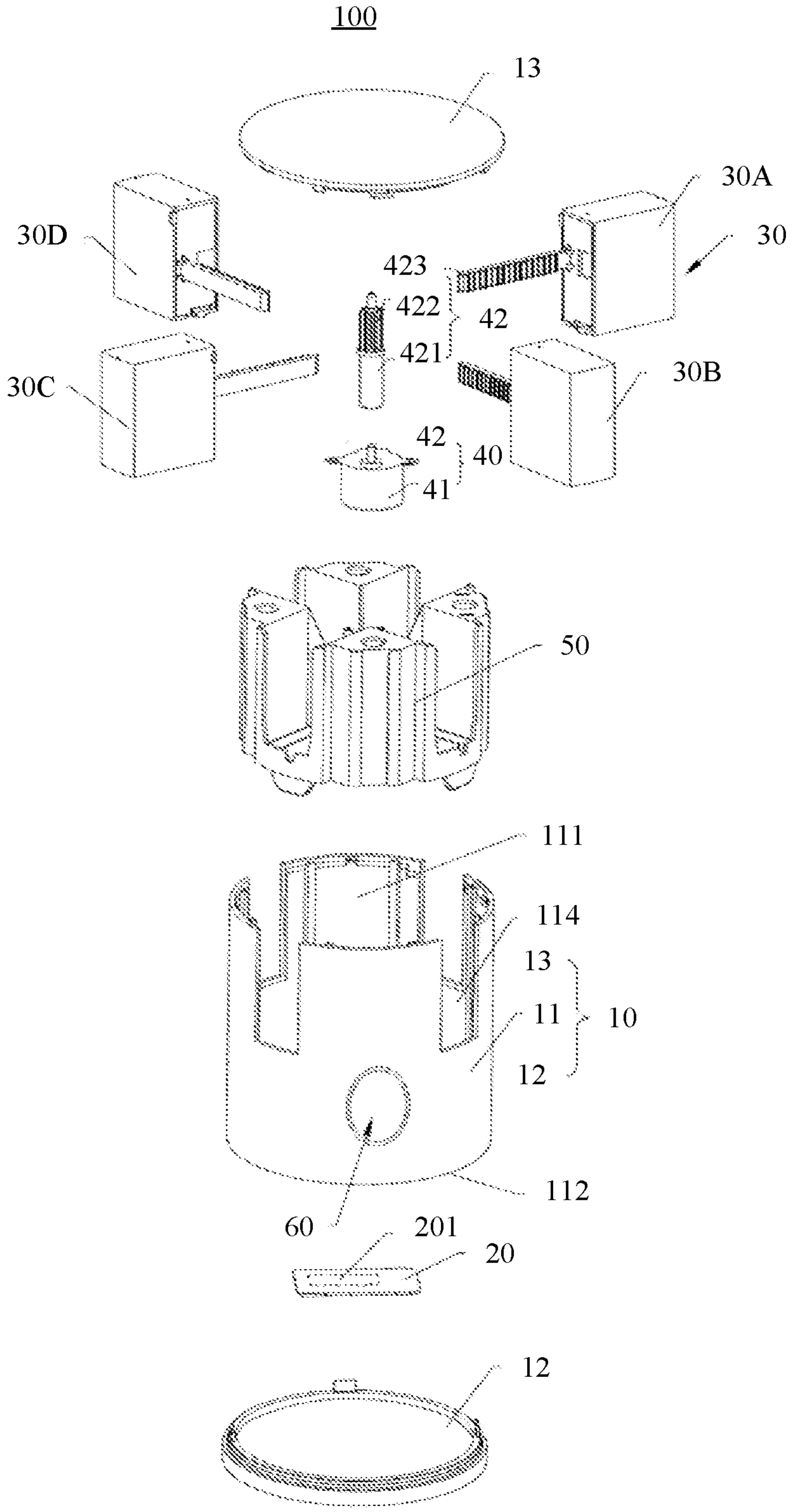
FIG. 3 is a schematic diagram of a split structure of the wireless data terminal shown in FIG. 1.
Figure 4:
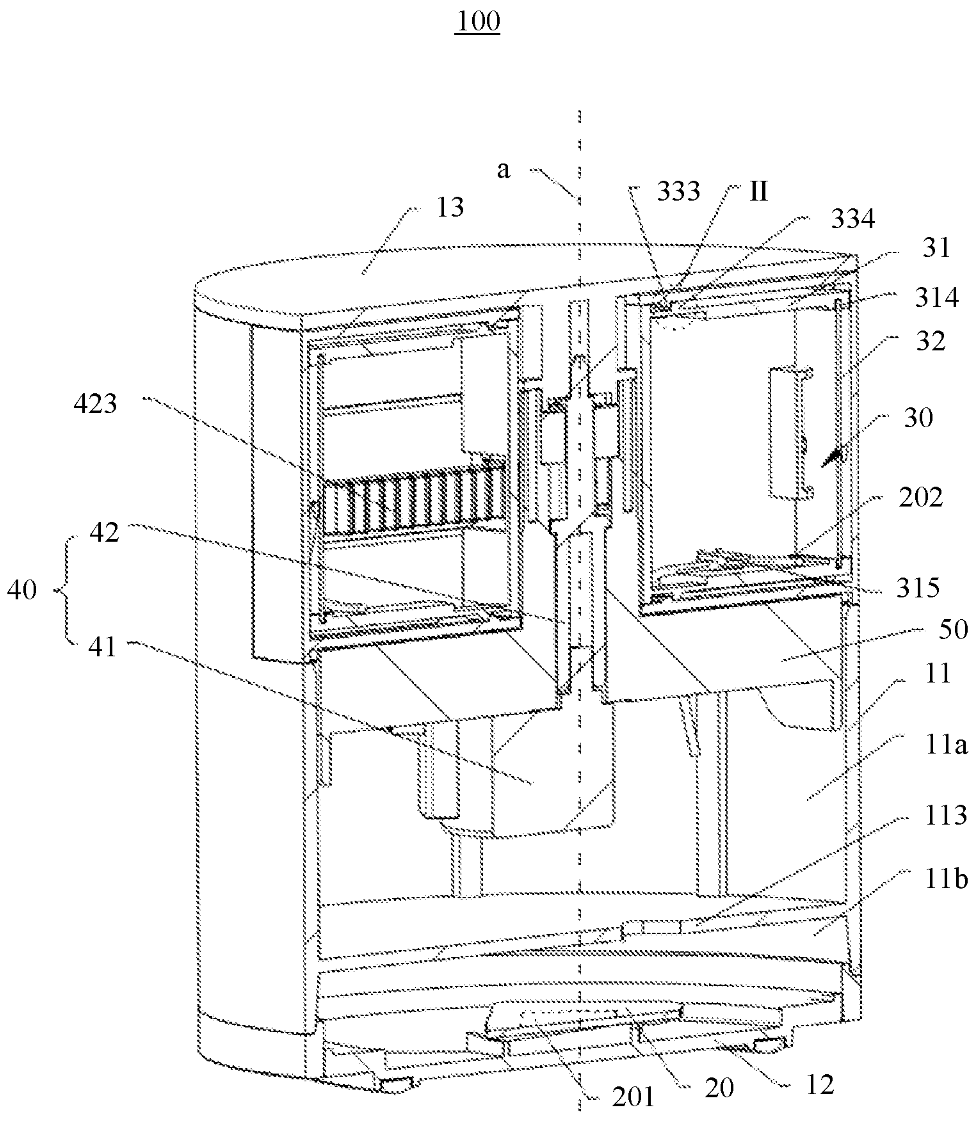
FIG. 4 is a schematic sectional view of the wireless data terminal shown in FIG. 1 along a direction I-I.

FIG. 3 is a schematic diagram of a split structure of the wireless data terminal 100 shown in FIG. 1. FIG. 4 is a schematic sectional view of the wireless data terminal 100 shown in FIG. 1 along a direction I-I. The wireless data terminal 100 includes a housing 10, a plurality of antenna assemblies 30, a mainboard 20, and a drive assembly 40.

The housing 10 is configured to accommodate another component of the wireless data terminal 100, to fasten and protect the another component. In addition, the housing 10 can also play a decorative role, so that the wireless data terminal 100 can have a good appearance effect. In this implementation, the mainboard 20 and the drive assembly 40 are accommodated in the housing 10. The housing 10 includes a main housing 11, a bottom housing 12, and a top housing 13. When the wireless data terminal 100 is placed on a bearing table, the bottom housing 12 is in contact with the bearing table. The top housing 13 and the bottom housing 12 are disposed opposite to each other on two sides of the main housing 11.

The main housing 11 is tubular, and a first opening 111 and a second opening 112 are respectively formed at two opposite ends of the main housing 11. An internal component of the wireless data terminal 100 may be mounted inside the main housing 11 from the first opening 111 or the second opening 112. The bottom housing 12 is mounted in the first opening 111, and the top housing 13 is mounted in the second opening 112. In this implementation, the main housing 11 is cylindrical tubular with openings at two ends. It may be understood that the main housing 11 may be designed in any shape based on a requirement, for example, may be a prism-shaped tubular structure or a prism-cone-shaped tubular structure.

A connection between the bottom housing 12 and the main housing 11 is a detachable connection (e.g., a snap-fit connection or a threaded connection), to facilitate subsequent fix or maintenance of the wireless data terminal 100. In another implementation, the connection between the bottom housing 12 and the main housing 11 may alternatively be a non-detachable connection (e.g., an adhesive connection), to reduce a risk of accidental falling off from the bottom housing 12, so that the wireless data terminal 100 is more reliable.

A connection between the top housing 13 and the main housing 11 is a detachable connection (e.g., a snap-fit connection or a threaded connection), to facilitate subsequent fix or maintenance of the wireless data terminal 100. In another implementation, the connection between the top housing 13 and the main housing 11 may alternatively be a non-detachable connection (e.g., an adhesive connection), to reduce a risk of accidental falling off from the top housing 13, so that the wireless data terminal 100 is more reliable.

A plurality of through holes 114 are disposed on the main housing 11, the plurality of through holes 114 are arranged at intervals along a circumferential direction of the main housing 11. Each through hole 114 is connected to an inner side and an outer side of the main housing 11, that is, the through hole 114 is a through hole that penetrates a tube wall of the main housing 11. The plurality of through holes 114 are in a one-to-one correspondence with the plurality of antenna assemblies 30. The drive assembly 40 is disposed inside the main housing 11, and the drive assembly 40 can drive the antenna assembly 30 to extend or retract relative to the housing 10 through a corresponding through hole 114, so that an extending or retracting direction of the antenna assembly 30 is limited to only a direction from a location on a central axis of the main housing to each through hole 114, thereby ensuring that the antenna assemblies 30 extend or retract in different directions. It may be understood that, in some other implementations of this application, the through hole 114 may also be disposed on the top housing 13 or the bottom housing 12, so that the antenna assembly 30 can extend or retract relative to the top housing 13 or the bottom housing 12 through the through hole 114.

In some implementations of this application, centers of the plurality of through holes 114 are on a same plane. When the antenna assemblies 30 extend out of the through holes 114, centers of the antenna assemblies 30 are on a same plane, so that the wireless data terminal 100 can have a good appearance effect. In some other implementations, the plurality of through holes 114 may alternatively be randomly disposed, that is, the centers of the antenna assemblies 30 may not be on a same plane, to meet an appearance design requirement. In addition, in some implementations, the centers of the antenna assemblies 30 are not on a same plane, and a connection line between the centers of the plurality of through holes 114 may be in a sawtooth shape or another shape.

In some implementations, the plurality of antenna assemblies 30 include at least two first antenna assemblies, a center of a pattern formed by connecting projections of the at least two first antenna assemblies on a reference plane is a first center, the first center is located on a central axis of the housing, and an included angle $\alpha_1$ formed between connection lines between the first center and projections of two adjacent first antenna assemblies on the reference plane satisfies a relation: $\alpha_1$=360°/N, where N is a quantity of first antenna assemblies. The reference plane is perpendicular to the central axis a (shown by a dashed line a in FIG. 4) of the housing 10. Specifically, connection lines between the first center and projections of the first antenna assemblies on the reference plane may be specifically connection lines between the first center and projections of centers of the first antenna assemblies on the reference plane. For example, when there are two first antenna assemblies, the two first antenna assemblies are symmetrically disposed relative to the central axis a of the housing 10, the first center is a midpoint of a connection line between projections of the two first antenna assemblies on the reference plane, and an included angle formed between connection lines between the first center and the projections of the first antenna assemblies on the reference plane is 180°. When there are three first antenna assemblies, the first center is a center of a triangle enclosed by projections of the three first antenna assemblies on the reference plane, and an included angle formed between connection lines between the first center and projections of two adjacent first antenna assemblies on the reference plane is 120°. The first antenna assemblies have a same operating frequency band. Coupling is more likely to occur between antenna assemblies that have a same operating frequency band, affecting isolation between antennas. In this application, the included angle $\alpha_1$ formed between the connection lines between the first center and the projections of the two adjacent first antenna assemblies on the reference plane satisfies the relation: $\alpha_1$=360°/N. That is, when there are two first antenna assemblies, the two first antenna assemblies are symmetrically disposed relative to the central axis of the housing; and when there are three or more first antenna assemblies, the first antenna assemblies are disposed at equal distances. This can ensure that a distance between any two adjacent first antenna assemblies can be longest, to improve isolation between antennas as much as possible.

In some implementations, the plurality of antenna assemblies 30 further include a plurality of second antenna assemblies. The second antenna assemblies have a same operating frequency band, and the operating frequency band of the first antenna assemblies is different from the operating frequency band of the second assemblies. A center of a pattern formed by connecting projections of at least two second antenna assemblies on the reference plane is a second center, the second center is located on the central axis of the housing, and an included angle $\alpha_2$ formed between connection lines between the second center and projections of two adjacent second antenna assemblies on the reference plane satisfies a relation: $\alpha_2$=360°/M, where M is a quantity of second antenna assemblies. The reference plane is perpendicular to the central axis a of the housing 10. Specifically, connection lines between the second center and projections of the second antenna assemblies on the reference plane may be connection lines between the second center and projections of centers of the second antenna assemblies on the reference plane. For example, when there are two second antenna assemblies, the two second antenna assemblies are symmetrically disposed relative to the central axis a of the housing 10, the second center is a midpoint of a connection line between projections of the two second antenna assemblies on the reference plane, and an included angle formed between connection lines between the second center and the projections of the second antenna assemblies on the reference plane is 180°. When there are three second antenna assemblies, the second center is a center of a triangle enclosed by projections of the three second antenna assemblies on the reference plane, and an included angle formed between connection lines between the second center and projections of two adjacent second antenna assemblies on the reference plane is 120°. Because operating frequency bands of the second antenna assemblies are the same, coupling is more likely to occur between the second antenna assemblies that have the same operating frequency band, affecting isolation between antennas. In this application, the included angle $\alpha_2$ formed between the connection lines between the second center and the projections of the two adjacent second antenna assemblies on the reference plane satisfies the relation: $\alpha_2$=360°/M. That is, when there are two second antenna assemblies, the two second antenna assemblies are symmetrically disposed relative to the central axis of the housing; and when there are three or more second antenna assemblies, the second antenna assemblies are disposed at equal distances. This can ensure that a distance between any two adjacent second antenna assemblies can be longest, to improve isolation between antennas as much as possible.

In some implementations, in the wireless data terminal 100, the quantity of first antenna assemblies is the same as the quantity of second antenna assemblies, a first antenna assembly is disposed between two adjacent second antenna assemblies, and a second antenna assembly is disposed between two adjacent first antenna assemblies, that is, the first antenna assemblies and the second antenna assemblies are alternately disposed. This ensures that distances from any first antenna assembly to two adjacent second antenna assemblies are the same, and avoids isolation caused by an excessively short distance between a first antenna assembly and an adjacent antenna assembly.

For example, in the implementation shown in FIG. 4, both an antenna assembly 30A and an antenna assembly 30C are first antenna assemblies, and an operating frequency band of the first antenna assembly is a 2.4 G Wi-Fi frequency band, that is, a first radiator included in the first antenna assembly can resonate to generate an operating frequency band of approximately 2.4 G. The antenna assembly 30A and the antenna assembly 30C are symmetrically disposed relative to the central axis a (shown by the dashed line a in FIG. 4) of the housing 10, that is, an included angle formed between connection lines between the first center and projections of the antenna assembly 30A and the antenna assembly 30C on the reference plane is 180°. Both an antenna assembly 30B and an antenna assembly 30D are second antenna assemblies, and an operating frequency band of the second antenna assembly is a 5 G Wi-Fi frequency band, that is, a radiator 322 included in the second antenna assembly can resonate to generate an operating frequency band of approximately 5 G. The antenna assembly 30B and the antenna assembly 30D are symmetrically disposed relative to the central axis of the housing 10, that is, an included angle formed between connection lines between the first center and projections of the antenna assembly 30B and the antenna assembly 30D on the reference plane is 180°. In addition, the antenna assembly 30A and the antenna assembly 30C are alternately disposed with the antenna assembly 30B and the antenna assembly 30D, that is, the antenna assembly 30A, antenna assembly 30B, antenna assembly 30C and the antenna assembly 30D are sequentially disposed in a circumferential direction of the housing 10. A connection line between the antenna assembly 30A and the antenna assembly 30C is perpendicular to a connection line between the antenna assembly 30B and the antenna assembly 30D. Two antenna assemblies 30 that have a same operating frequency band are symmetrically disposed relative to the central axis a of the housing 10, and antenna assemblies 30 that have different operating frequency bands are alternately disposed, so that the antenna assemblies 30 can be arranged as close as possible in the wireless data terminal 100, to reduce a size of the wireless data terminal 100, maximize a distance between two radiators 322 that have a same operating frequency band, and reduce coupling between signals transmitted by the two radiators 322 that have the same operating frequency band. In this way, better antenna performance is achieved.

Figure 5:
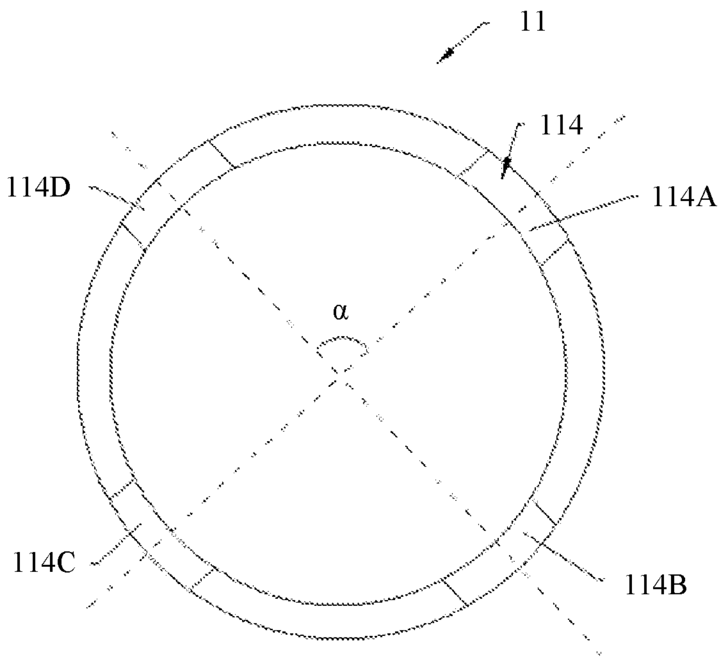
FIG. 5 is a top view of a main housing of the wireless data terminal shown in FIG. 3.

In some implementations of this application, the plurality of through holes 114 are arranged at even intervals in a circumferential direction of the main housing 11. That is, when two through holes 114 are disposed on the main housing 11, the two through holes 114 are symmetrically disposed relative to the central axis a of the housing 10. When three or more through holes 114 are disposed on the main housing 11, two adjacent through holes 114 have a same distance in the circumferential direction of the main housing 11, to avoid an excessively short distance between the two adjacent through holes 114, so as to avoid an excessively short distance between two adjacent antenna assemblies 30 corresponding to the two adjacent through holes 114. In addition, the plurality of through holes 114 on the housing 10 are arranged at even intervals along a circumferential direction of a tube wall of the main housing 11, so that the wireless data terminal 100 can have symmetrical elegance, and an appearance effect of the wireless data terminal 100 is improved. FIG. 5 is a top view of the main housing 11 of the wireless data terminal 100 shown in FIG. 3. In this implementation, there are four antenna assemblies 30, and therefore there are also four through holes 114 that are in a one-to-one correspondence with the antenna assemblies 30. The four through holes 114 are respectively a through hole 114A, a through hole 114B, a through hole 114C, and a through hole 114D. The through hole 114A corresponds to the antenna assembly 30A, and the antenna assembly 30A extends or retracts relative to the housing 10 through the through hole 114A; the through hole 114B corresponds to the antenna assembly 30B, and the antenna assembly 30B extends or retracts relative to the housing 10 through the through hole 114B; the through hole 114C corresponds to the antenna assembly 30C, and the antenna assembly 30C extends or retracts relative to the housing 10 through the through hole 114C; and the through hole 114D corresponds to the antenna assembly 30D, and the antenna assembly 30D extends or retracts relative to the housing 10 through the through hole 114D. A central angle α presented by centers of any two adjacent through holes 114 of the four through holes 114 is 90°, that is, the four through holes 114 are evenly disposed along the circumferential direction of the main housing 11.

Figure 6:
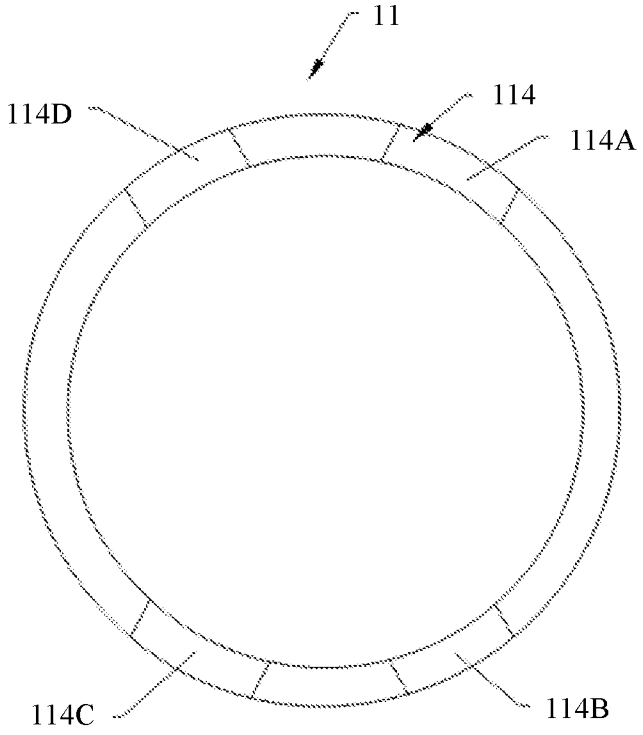
FIG. 6 is a top view of a main housing of a wireless data terminal according to another implementation of this application.

It should be noted that, in some implementations, the plurality of through holes 114 may alternatively be arranged at uneven intervals in the circumferential direction of the main housing 11. That is, when two through holes 114 are disposed on the main housing 11, the two through holes 114 cannot be symmetrically disposed relative to the central axis a of the housing 10. When three or more through holes 114 are disposed on the main housing 11, there may be a different distance between every two adjacent through holes 114 on the main housing 11, to meet a requirement in actual application. For example, when a distance between two adjacent antenna assemblies 30 has little impact on isolation between antennas, and a distance between the other two antenna assemblies 30 has great impact on isolation between the antennas, the distance between the two adjacent antenna assemblies 30 may be less than the distance between the other two adjacent antenna assemblies 30. Therefore, a distance between two through holes 114 corresponding to the two adjacent antenna assemblies 30 is less than a distance between two through holes 114 corresponding to the other two adjacent antenna assemblies 30. FIG. 6 is a top view of a main housing 11 of a wireless data terminal 100 according to another implementation of this application. In the implementation shown in FIG. 6, an antenna assembly 30A corresponding to a through hole 114A and an antenna assembly 30D corresponding to a through hole 114D have different operating frequencies, and a distance between the antenna assembly 30A and the antenna assembly 30D have little impact on isolation between antennas. The antenna assembly 30A corresponding to the through hole 114A and an antenna assembly 30C corresponding to a through hole 114C have a same operating frequency, and a distance between the antenna assembly 30A and the antenna assembly 30C have great impact on isolation between the antennas. Therefore, a distance between the through hole 114A and the through hole 114D is less than a distance between the through hole 114A and the through hole 114C.

Refer to FIG. 3 and FIG. 4 again. In some implementations, an inner cavity of the main housing 11 further includes a partition plate 113. The partition plate 113 divides the inner cavity of the main housing 11 into a first cavity 11*a* and a second cavity 11*b* that are stacked. The first cavity 11*a* is connected to the first opening 111, and the second cavity 11*b* is connected to the second opening 112. The drive assembly 40 and the antenna assembly 30 are accommodated in the second cavity 11*b*, and the mainboard 20 is disposed in the first cavity 11*a*. The partition plate 113 is disposed, so that radial strength of the main housing 11 can be enhanced, and the main housing 11 is prevented from being damaged by an action force in a radial direction. The partition plate 113 separates the mainboard 20 from the antenna assembly 30 in different space, to reduce entering of impurities such as water and dust from the first cavity 11*a* into the second cavity 11*b*, so that the mainboard 20 in the first cavity 11*a* is prevented from being damaged due to impact of the impurities. In addition, the mainboard 20 and the antenna assembly 30 are located in different cavities, to ensure that a distance between the antenna assembly 30 and the mainboard 20 can be long enough, so that impact of electromagnetic radiation generated when the mainboard 20 works on signal transmission of the antenna assembly 30 is avoided.

A radio frequency front-end circuit 201 is integrated on the mainboard 20. The radio frequency front-end circuit 201 is configured to process a radio frequency signal. Specifically, the radio frequency front-end circuit 201 can be configured to modulate a radio frequency signal or demodulate a radio frequency signal. The antenna assembly 30 is electrically connected to the radio frequency front-end circuit 201. A radio frequency signal modulated by the radio frequency front-end circuit 20 is transmitted to the antenna assembly 30 and output by using the antenna assembly 30, or a radio frequency signal received by the antenna assembly 30 is transmitted to the radio frequency front-end circuit 201 and demodulated by the radio frequency front-end circuit 201. In this implementation, the antenna assembly 30 is electrically connected to the radio frequency front-end circuit 201 through a feeder 202. The feeder 202 may be a coaxial line, a microstrip, or a flexible circuit board. A hole is disposed on the antenna partition plate 113, and the feeder 202 passes through the hole to connect the antenna assembly 30 in the first cavity 11*a* to the radio frequency front-end circuit 201 in the second cavity 11*b*.

Figure 7:
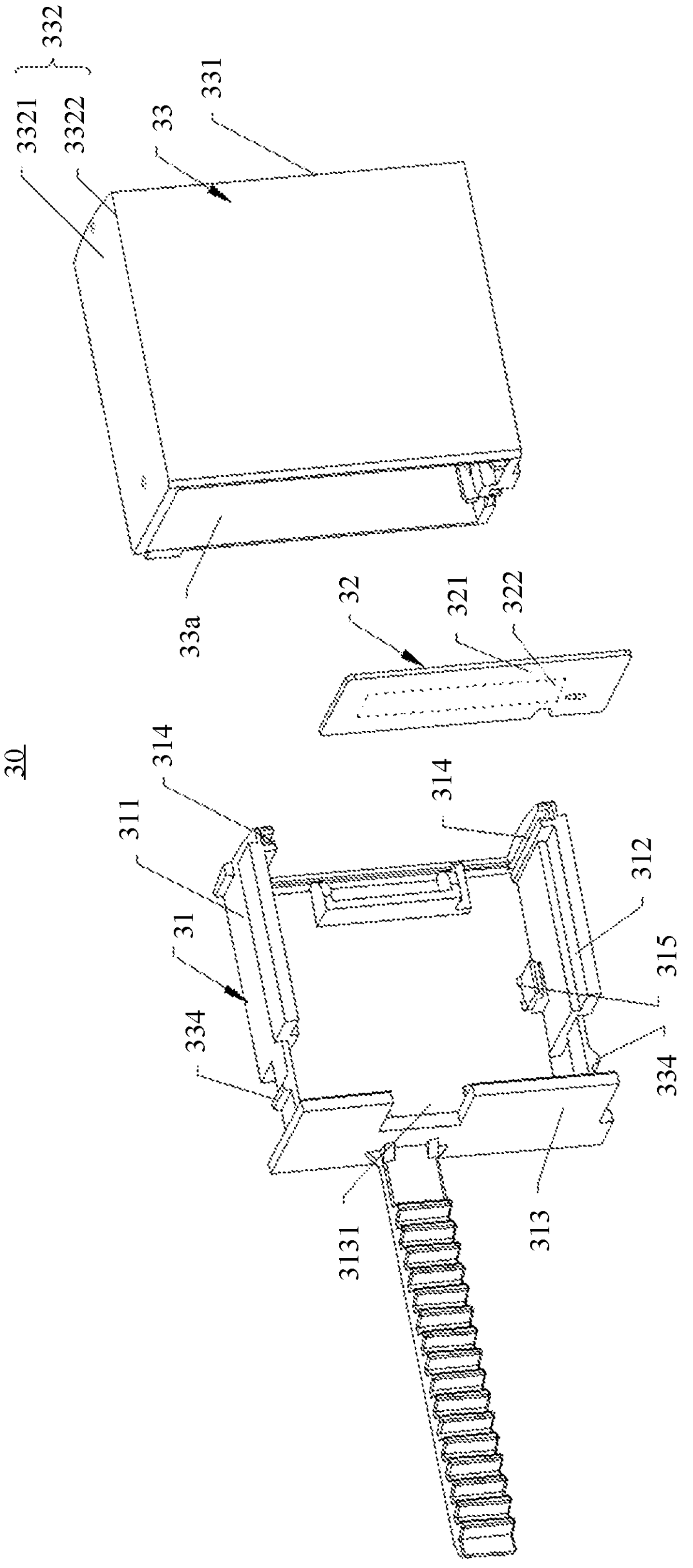
FIG. 7 is a schematic diagram of a split structure of an antenna assembly of the wireless data terminal shown in FIG. 3.

Refer to FIG. 4 and FIG. 7. FIG. 7 is a schematic diagram of a split structure of the antenna assembly 30 of the wireless data terminal 100 shown in FIG. 3. Each antenna assembly 30 includes an antenna bracket 31 and an antenna body 32 mounted on the antenna bracket 31. An antenna bracket 31 included in the first antenna assembly is a first antenna bracket, and an antenna body 32 included in the first antenna assembly is a first antenna body. An antenna bracket 31 included in the second antenna assembly is a second antenna bracket, and an antenna body 32 included in the second antenna assembly is a second antenna body. The antenna body 32 includes a carrier 321 and a radiator 322 disposed on the carrier 321. A radiator included in the first antenna body is a first radiator, and a radiator included in the second antenna assembly is a second radiator. The radiator 322 is configured to transmit or receive a radio frequency signal. An antenna in this application may be antennas of various types, such as a ceramic antenna, a circuit board antenna, a steel sheet antenna, a laser direct structuring (LDS) antenna, or an in-mold injection molding antenna. In this implementation, the antenna is a circuit board antenna, the antenna body 32 is a printed circuit board (PCB), the carrier 321 is a dielectric plate of the printed circuit board, a conductive printed pattern is formed on the dielectric plate, and the formed conductive printed pattern is the radiator 322 of the antenna. Patterns of radiators 322 of antennas may be different when the antennas have different operating frequency bands. In implementations of this application, an operating frequency band of an antenna corresponding to the first radiator is different from an operating frequency band of an antenna corresponding to the second radiator, and patterns of the first radiator and the second radiator are different. For example, the wireless data terminal 100 of the implementation shown in FIG. 4 is a dual-band router, and can work in a 2.4 G Wi-Fi frequency band and a 5 G Wi-Fi frequency band. Specifically, in the implementation shown in FIG. 4, both the first radiator included in the antenna assembly 30A and the first radiator included in the antenna assembly 30C can resonate to generate an operating frequency band of approximately 2.4 G, and both the second radiator included in the antenna assembly 30B and the second radiator included in the antenna assembly 30D can resonate to generate an operating frequency band of approximately 5 G. It may be understood that a quantity of antennas and an operating frequency band of an antenna may be changed based on an actual requirement. For example, there may be three or six antennas, and the operating frequency band of the antennas may be approximately 4 G.

The antenna further includes the feeder 202. One end of the feeder 202 is electrically connected to the radiator 322, and the other end of the feeder 202 is electrically connected to the radio frequency front-end circuit 201, to electrically connect the antenna assembly 30 to the radio frequency front-end circuit 201 through the feeder 202. In some implementations, a fastener 315 is further disposed in the antenna bracket 31, and the feeder 202 is fastened to the antenna bracket 31 by using the fastener 315, to avoid a problem that a connection between the feeder 202 and the radiator 322 is broken due to pulling of the feeder 202 during extending or retracting of the antenna assembly 30. For example, the fastener 315 may be a fastener, a snap ring, or the like, and fasten the feeder 202 inside the antenna bracket 31.

In some implementations, the antenna body 32 is parallel to the central axis a of the housing 10. When the wireless data terminal 100 is placed on a horizontal bearing table, the central axis a of the housing 10 is perpendicular to a vertical plane of the bearing table. In this case, the antenna body 32 is in a vertical state, to ensure that the antenna can have a better antenna radiation range. It may be understood that, in some other implementations, the plane in which the antenna body 32 is located may alternatively intersect the central axis a of the housing 10.

A connection between the antenna body 32 and the antenna bracket 31 is a detachable connection (e.g., a clamping connection), to facilitate operations such as maintenance and replacement of the antenna body 32 or the antenna bracket 31. In the implementation of this application, the antenna bracket 31 is of a rectangular frame structure, and includes a first bezel 311 and a second bezel 312 that are disposed opposite to each other, and a third bezel 313 connected between the first bezel 311 and the second bezel 312. The third bezel 313 is located at one end of each of the first bezel 311 and the second bezel 312, and the antenna body 32 is located at the other end that is of each of the first bezel 311 and the second bezel 312 and that is away from the third bezel 313. In some implementations, sliding grooves 314 are disposed opposite to each other at the end that is of the first bezel 311 and that is away from the third bezel 313 and the end that is of the second bezel 312 and that is away from the third bezel 313, and two opposite edges of the antenna body 32 are respectively snapped in the sliding groove 314 of the first bezel 311 and the sliding groove 314 of the second bezel 312, to snap the antenna body 32 and the antenna bracket 31, to implement a detachable connection between the antenna body 32 and the antenna bracket 31. In another implementation, the connection between the bottom housing 12 and the main housing 11 may alternatively be a non-detachable connection (e.g., an adhesive connection), to reduce a risk of accidental detachment of the antenna body 32 and the antenna bracket 31, so that the wireless data terminal 100 is more reliable.

The third bezel 313 of each antenna assembly 30 is located between the antenna body 32 and the central axis a of the housing 10, so that a distance between the antenna bodies 32 of the antenna assemblies 30 can be longest, to ensure isolation between the antennas as much as possible.

In some implementations, the antenna assembly 30 further includes an antenna housing 33. The antenna body 32 and the antenna bracket 31 are accommodated in the antenna housing 33. The antenna housing 33 is configured to protect the antenna body 32 and the antenna bracket 31 that are located inside the antenna housing 33, and ensure that the wireless data terminal 100 can have a good appearance in any state. An antenna housing 33 included in the first antenna assembly is a first antenna housing, and an antenna housing 33 included in the second antenna assembly is a second antenna housing. In this implementation, the antenna housing 33 includes an accommodating cavity 33*a* having an opening on one side, and the antenna body 32 and the antenna bracket 31 are disposed in the accommodating cavity 33*a* by using the opening and are fastened to the antenna housing 33. Specifically, the antenna housing 33 includes a bottom wall 331 and a side wall 332 that is disposed around an outer edge of the bottom wall 331, and the bottom wall 331 and the side wall 332 enclose the accommodating cavity 33*a*. The bottom wall 331 and the opening of the accommodating cavity 33*a* are disposed opposite to each other. When the antenna body 32 and the antenna bracket 31 are accommodated in the antenna housing 33, the antenna body 32 is close to the bottom wall 331 of the antenna housing 33, so that the antenna body 32 can be closest to the outside of the wireless data terminal 100, and can more effectively receive and transmit a radio frequency signal.

In this implementation of this application, a size and a shape of a cross section that is of the side wall 332 of the antenna housing 33 and that is perpendicular to a movement direction of the antenna assembly 30 corresponding to the antenna housing 33 are basically the same as a size and a shape of the through hole 114 corresponding to the antenna assembly 30, to ensure that the antenna assembly 30 can extend out of or retract in the housing 10 through the through hole 114, and reduce a gap between the antenna housing 33 and the through hole 114 as much as possible, so as to ensure that the wireless data terminal 100 has a good appearance, and prevent impurities such as water and dust from entering the housing 33 through the gap between the housing 33 and the through hole 114. In this implementation, the side wall 332 of the antenna is a rectangular frame, and includes two first side walls 3321 that are disposed opposite to each other and two second side walls 3322 that are disposed opposite to each other. The second side wall 3322 is connected between the two first side walls 3321. When the antenna assembly 30 is located at the first location relative to the housing 10, an outer surface that is of the bottom wall 331 of the antenna housing 33 and that is away from the accommodating cavity 33*a* and the outer surface of the housing 10 are coplanar. In this case, the surface that is of the antenna assembly 30 and that faces the outer side of the housing 10 and the outer surface of the housing 10 are coplanar to provide a better appearance effect. In this implementation, the wireless data terminal 100 is of a cylindrical structure in the first state, and the outer surface of the bottom wall 331 of the antenna housing 33 is a curved surface whose curvature radius is the same as a curvature radius of the outer surface of the housing 10. When the antenna assembly 30 is located at the first location relative to the housing 10, a surface that is of the bottom wall 331 of the antenna housing 33 and that is away from the central axis a of the housing 10 and a surface of the housing 10 are on a same arc surface. Optionally, in some other implementations, the wireless data terminal 100 may alternatively be in another shape. For example, the wireless data terminal 100 is of a quadrangular prism structure in the first state. In this case, an outer surface of the bottom wall 331 of the antenna housing 33 is a flat surface. When the antenna assembly 30 is located at the first location relative to the housing 10, the outer surface of the bottom wall 331 of the antenna housing 33 and an outer surface of the housing 10 are on a same plane.

In an implementation of this application, the housing 10, the antenna housing 33, and the antenna bracket 31 are all made of insulation materials, to avoid impact on a radio frequency signal transmitted by the antenna.

Figure 8:
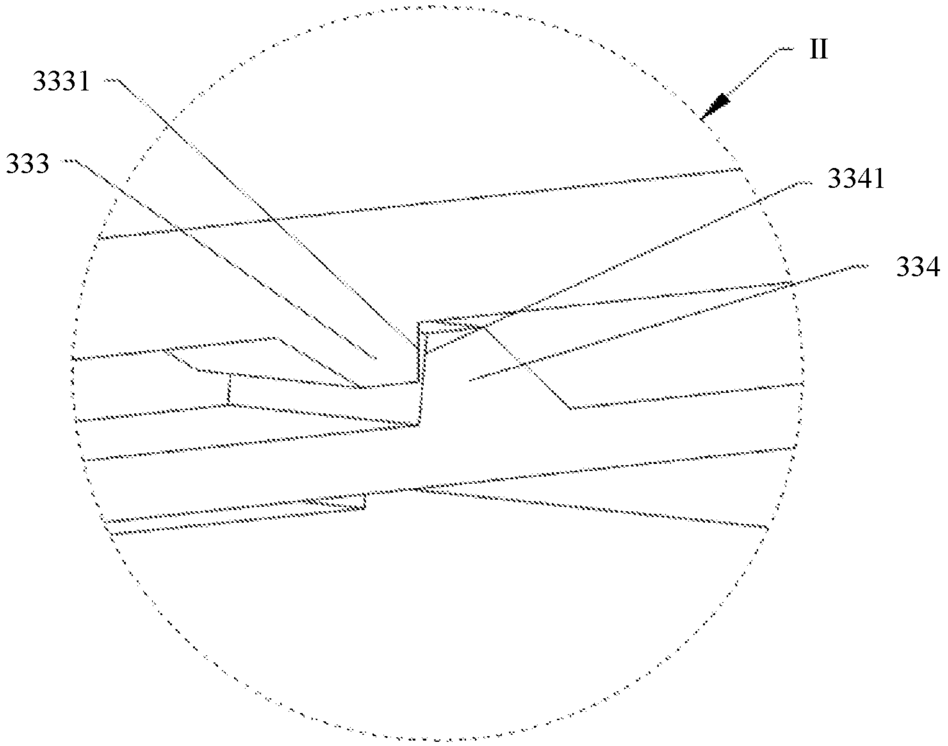
FIG. 8 is a schematic diagram of an enlarged structure of a location II in FIG. 4.

The antenna bracket 31 may be detachably disposed in the antenna housing 33, to facilitate operations such as maintenance and replacement of the antenna bracket 31 and the antenna body 32 disposed on the antenna bracket 31. For example, the antenna bracket 31 may be disposed in the antenna housing 33 in a detachable connection manner such as a screw connection or a clamping connection. Refer to FIG. 4 and FIG. 8. FIG. 8 is a schematic diagram of an enlarged structure of a location II in FIG. 4. In this implementation, a first protrusion 333 is disposed on each of the two first side walls 3321, and the first protrusion 333 includes a first limiting surface 3331 that faces the bottom wall. A second protrusion 334 is disposed on each of the first bezel 311 and the second bezel 312 of the antenna bracket 31, and the second protrusion 334 includes a second limiting surface 3341 that is away from a surface of the antenna body 32. When the antenna bracket 31 is accommodated in the antenna housing 33, an end that is of each of the first bezel 311 and the second bezel 312 of the antenna bracket 31 and that is far from the third bezel 333 abuts against the bottom wall 331 of the antenna housing 33, and the second limiting surface 3341 abuts against the first limiting surface 3331. In this way, the antenna bracket 31 is clamped and fastened in the antenna housing 33. In another implementation, the connection between the bottom housing 12 and the main housing 11 may alternatively be a non-detachable connection (e.g., an adhesive connection), to reduce a risk of accidental detachment of the antenna bracket 31 and the antenna housing 33, so that the wireless data terminal 100 is more reliable.

In some implementations, the antenna further includes a tuning element such as a capacitor or a resistor. The tuning element is connected between the radiator 322 and the radio frequency front-end circuit 201, and an operating frequency of the antenna is adjusted by using the tuning element. The tuning element may be integrated on the carrier 321 of the antenna body 32, or integrated on the mainboard 20, or connected to the feeder 202.

Refer to FIG. 3 and FIG. 4 again. In some implementations of this application, the drive assembly 40 includes a drive part 41 and a transmission part 42. The transmission part 42 is connected to the antenna assembly 30. The drive part 41 is configured to drive the transmission part 42 to move, and the transmission part 42 moves to drive the antenna assembly 30 to extend out of or retract in the housing 10. In the implementation shown in FIG. 3, the drive part 41 includes a motor, and the transmission part 42 includes a gear 421, a gear shaft 422, and a rack 423. The gear 421 is connected to the gear shaft 422, and an axis of the gear 421 coincides with an axis of the gear shaft 422. The axis of the gear 421 is parallel to or coincides with the central axis a of the housing 10. The motor is connected to the gear shaft 422, and drives the gear shaft 422 to rotate by using the axis of the gear shaft 422 as a rotation axis. The gear shaft 422 rotates to drive the gear 421 to rotate by using the axis as a rotation axis. The rack 423 is engaged with the gear 421, and the gear 421 rotates to drive the rack 423 to move along a length direction of the rack 423. There are a plurality of racks 423. The plurality of racks 423 are in a one-to-one correspondence with the plurality of antenna assemblies 30. One end of each rack 423 is connected to an antenna assembly 30 corresponding to the rack 423, and the rack 423 moves to drive the antenna assembly 30 corresponding to the rack 423 to extend or retract relative to the housing 10. In some implementations, extension directions of the racks 423 are different. When the gear 421 drives the racks 423 engaged with the gear 421, the racks 423 can drive the antenna assemblies 30 connected to the corresponding racks 423 to move in different directions. An extension direction of the rack 423 is from an end that is of the rack 423 and that is away from the antenna assembly 30 to an end that is of the rack 423 and that is connected to the antenna assembly 30.

In some implementations, the rack 423 is connected to the antenna bracket 31 and is integrally formed with the antenna bracket 31, and the gear 421 and the gear shaft 422 may also be integrally formed, to reduce assembly steps and improve production efficiency.

In another implementation of this application, the drive part 41 and the transmission part 42 may alternatively be other structures. For example, the drive part 41 may be a drive structure such as a cylinder, and the transmission part 42 may be a transmission structure such as a turbine and a worm, a turbine and a lead screw, or a turbine and a connecting rod. It may be understood that the transmission part 42 may be a transmission structure, or may be a combination of transmission structures of different types. For example, the transmission part 42 may include a gear 421, racks 423, and lead screws, some antenna assemblies 30 are connected to the racks 423, and some antenna assemblies 30 are connected to the lead screws. The drive part 41 can drive the gear 421 and the lead screw to rotate. The gear 421 rotates and drives an antenna assembly 30 connected to the rack 423 to extend or retract relative to the housing 10. When the drive part 41 drives the lead screw to rotate, the lead screw rotates and drives an antenna assembly 30 connected to the lead screw to extend or retract relative to the housing 10.

Figure 9:
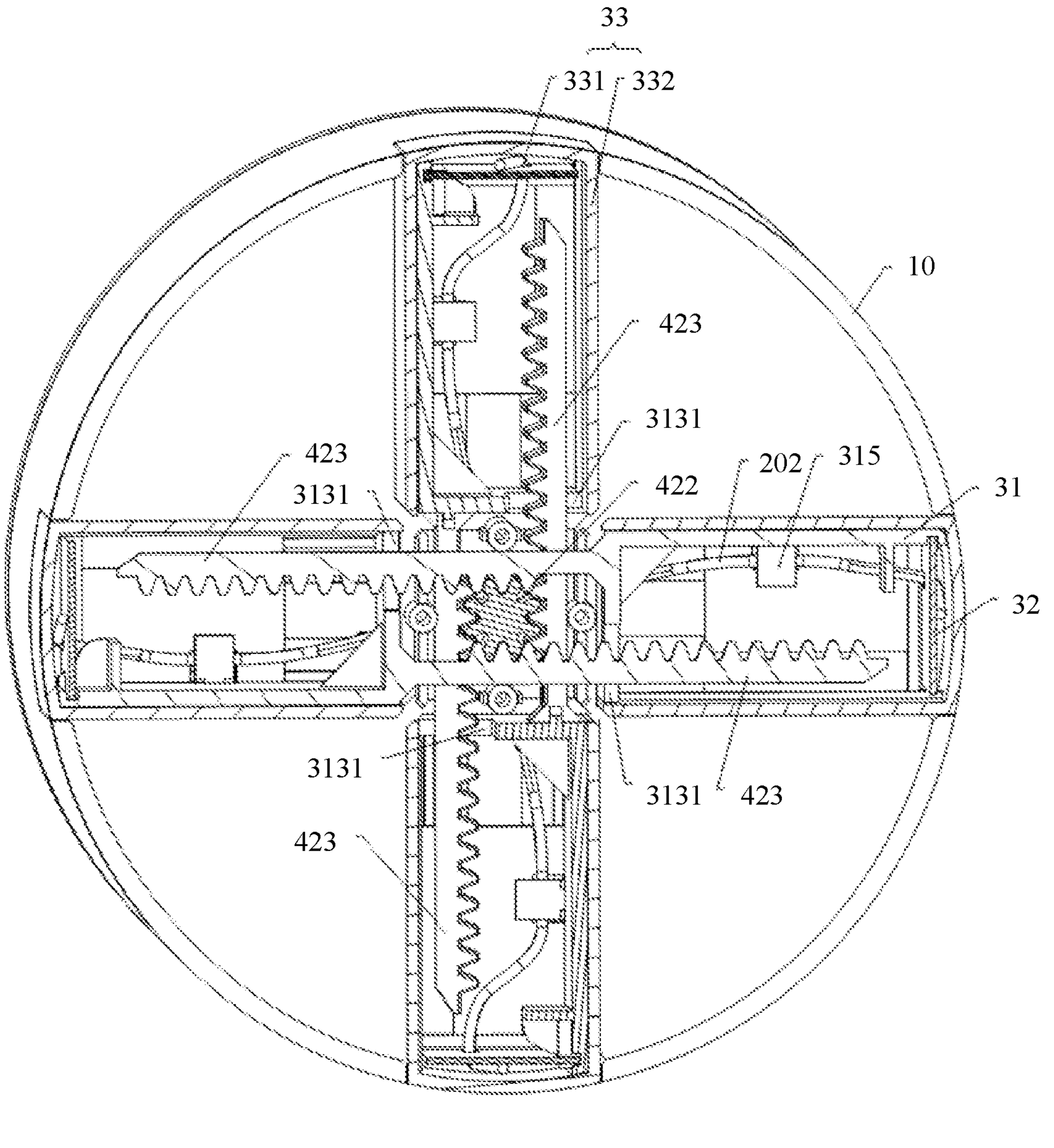
FIG. 9 is a schematic sectional view of the wireless data terminal shown in FIG. 1 along a direction II-II in FIG. 1.

In some implementations of this application, the drive part 41 can simultaneously drive a plurality of antenna assemblies 30 to move to extend out of or retract in the housing 10, to improve drive efficiency. FIG. 9 is a sectional view of the wireless data terminal 100 in the implementation shown in FIG. 1 along a direction II-II. There are four antenna assemblies 30 and four racks 423. The four racks 423 are respectively engaged with different locations on a same gear 421. When the gear 421 rotates, the gear 421 can simultaneously drive the four racks 423 to move, to further drive the four antenna assemblies 30 connected to the four racks 423 to extend out of or retract in the housing 10 simultaneously, so as to improve drive efficiency. In addition, one motor and one gear 421 can drive the plurality of antenna assemblies 30 to move simultaneously. This can simplify an internal structure of the wireless data terminal 100, simplify an assembly process, and improve production efficiency. In this implementation, because the four racks 423 are engaged with different locations on the same gear 421, the four antenna assemblies 30 move a same distance within a same time period.

Figure 10:
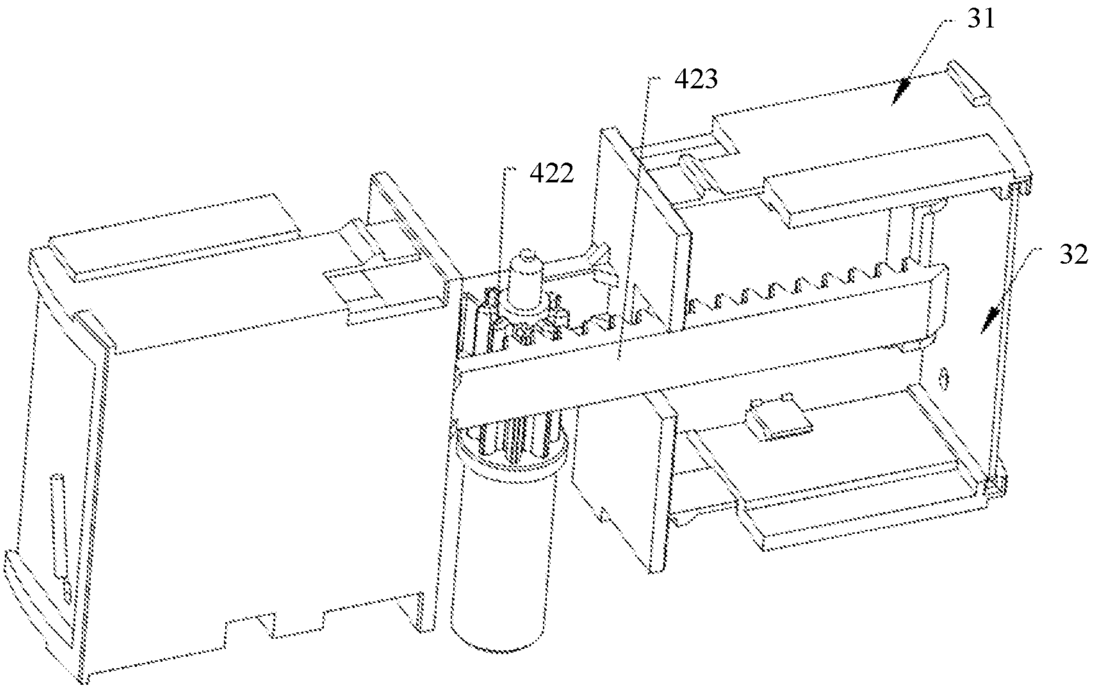
FIG. 10 is a schematic diagram of a partial structure of engagement between a rack and a gear of the wireless data terminal shown in FIG. 1.

In some implementations of this application, a rack 423 connected to the antenna assembly 30A and a rack 423 connected to the antenna assembly 30C are on a same plane and disposed in parallel; and a rack 423 connected to the antenna assembly 30B and a rack 423 connected to the antenna assembly 30D are on a same plane and disposed in parallel. The rack 423 connected to the antenna assembly 30A and the rack 423 connected to the antenna assembly 3B are disposed perpendicularly. Therefore, in this implementation, movement directions of two adjacent antenna assemblies 30 are perpendicular, and when the adjacent antenna assemblies 30 extend or retract relative to the housing 10, a change of a distance between adjacent radiators 322 is largest. Refer to FIG. 9 and FIG. 10. FIG. 10 is a schematic diagram of a partial structure of engagement between a rack 423 and a gear 422 of the wireless data terminal 100 shown in FIG. 1. In this implementation, a notch 3131 is disposed on the third bezel 313 of the antenna bracket 31, and a rack 423 corresponding to another antenna assembly 30 disposed symmetrically with the antenna assembly 30 can extend to the antenna bracket 31 through the notch 3131, to ensure that when the wireless data terminal 100 is in the first state, the plurality of antenna assemblies 30 can retract to a maximum extent, so as to reduce a volume occupied by the wireless data terminal 100. For example, in this implementation, when the wireless data terminal 100 is in the first state, the rack 423 connected to the antenna assembly 30A can pass through a notch 3131 on the third bezel 313 of the antenna assembly 30C, the rack 423 connected to the antenna assembly 30C can pass through a notch 3131 on the third bezel 313 of the antenna assembly 30A, the rack 423 connected to the antenna assembly 30B can pass through a notch 3131 on the third bezel 313 of the antenna assembly 30D, and the rack 423 connected to the antenna assembly 30D can pass through a notch 3131 on the third bezel 313 of the antenna assembly 30B. In some implementations, when the wireless data terminal 100 is in the first state, the end that is of the rack 423 and that is away from the antenna assembly 30 connected to the rack 423 passes through a notch 313 on a third bezel 313 of another antenna assembly 30, and is in contact with a mainboard 20 of the another antenna assembly 30. In this case, a length of the antenna assembly 30 extending out of the housing 10 is a longest distance from the mainboard 20 to the gear 421. A distance from the bottom wall 331 of the antenna housing 33 to the opening of the antenna housing 33 is greater than or equal to a distance from the end that is of the rack 423 and that is away from the antenna assembly 30 to the gear 421, to ensure that when the antenna assembly 30 extends out of the housing 10 to a maximum extent, the antenna housing 33 is at least partially located in the housing 10, so as to ensure that the wireless data terminal 100 can have a good appearance effect. It may be understood that, in some other implementations, when the wireless data terminal 100 is in the first state, there is a distance between the mainboard 20 and the end that is of the rack 423 and that is away from the antenna assembly 30 connected to the rack 423.

In a process in which the antenna assembly 30 gradually retracts in the housing 10, a location at which the gear 421 is engaged with the rack 423 is gradually close to the antenna assembly 30. In a process in which the antenna assembly 30 gradually extends out of the housing 10, a distance between the antenna bodies 32 is gradually increased, and isolation between the antennas is gradually increased. In this application, a degree to which the antenna assembly 30 extends out of the housing 10 can be adjusted based on an actual requirement, to reduce a size of the wireless data terminal 100 as much as possible while ensuring that a requirement of isolation between the antennas is met.

In some implementations of this application, the drive assembly 40 can drive each antenna assembly 30 to extend or retract relative to the housing 10. For example, in some implementations, the drive part 41 includes a plurality of motors, and the transmission part 42 includes a plurality of gears 421 and a plurality of racks 423. Each motor is connected to at least one gear 421, each gear 421 is engaged with and connected to at least one rack 423, and one end of each rack 421 is fastened to one antenna assembly 40. Different motors can respectively drive different antenna assemblies 30 to move relative to the housing 10. For example, a difference between a wireless data terminal 100 in another implementation of this application and the implementation shown in FIG. 4 lies in that there are two motors and two gears 421 in this implementation. One gear 421 is correspondingly connected to one motor. The rack 423 connected to the antenna assembly 30A and the rack 423 connected to the antenna assembly 30C are engaged with one of the gears 421, and the rack 423 connected to the antenna assembly 30B and the rack 423 connected to the antenna assembly 30D are engaged with the other gear 421. In some states, only the antenna assembly 30A and the antenna assembly 30C may be driven to extend or retract relative to the housing 10, or only the antenna assembly 30B and the antenna assembly 30D may be driven to extend or retract relative to the housing 10.

Refer to FIG. 3 and FIG. 4 again. In some implementations, the wireless data terminal 10 further includes a bearing bracket 50. The bearing bracket 50 is configured to bear the drive assembly 40 and the antenna assembly 30. The bearing bracket 50 is fastened in the housing 10. A through hole 51 and a plurality of grooves 52 are disposed on the bearing bracket 50. The bearing bracket 50 includes a first surface 50*a* and a second surface 50*b* that are disposed opposite to each other, and a side surface 50*c* connected between the first surface 50*a* and the second surface 50*b*. The first surface 50*a* faces the top housing 13, and the second surface 50*b* faces the bottom housing 12. The groove 52 is concavely formed from the first surface 50*a* to the second surface 50*b*. One end of each of the plurality of grooves 52 is connected to the through hole 51, and the other end of each of the plurality of grooves 52 extends to the side surface 50*c* to form an opening 521 on the side surface 50*c*. The opening 521 is directly opposite to the through hole 114 on the housing 10.

The grooves 52 are in a one-to-one correspondence with the antenna assemblies 30, and the antenna assemblies 30 are disposed in the corresponding grooves 52. The gear 421 and the gear shaft 422 of the drive assembly 40 are disposed in the through hole 51. One end of the rack 423 is engaged with the gear 421, and the other end of the rack 423 extends to the groove 52 and is connected to the corresponding antenna assembly 30. An extension direction of the groove 52 is the same as a movement direction of the corresponding antenna assembly 30. When the antenna assembly 30 extends out of or retracts in the housing 10, the antenna assembly 30 can move along the extension direction of the groove 52, to ensure that a movement process of the antenna assembly 30 is stable.

Figure 11:
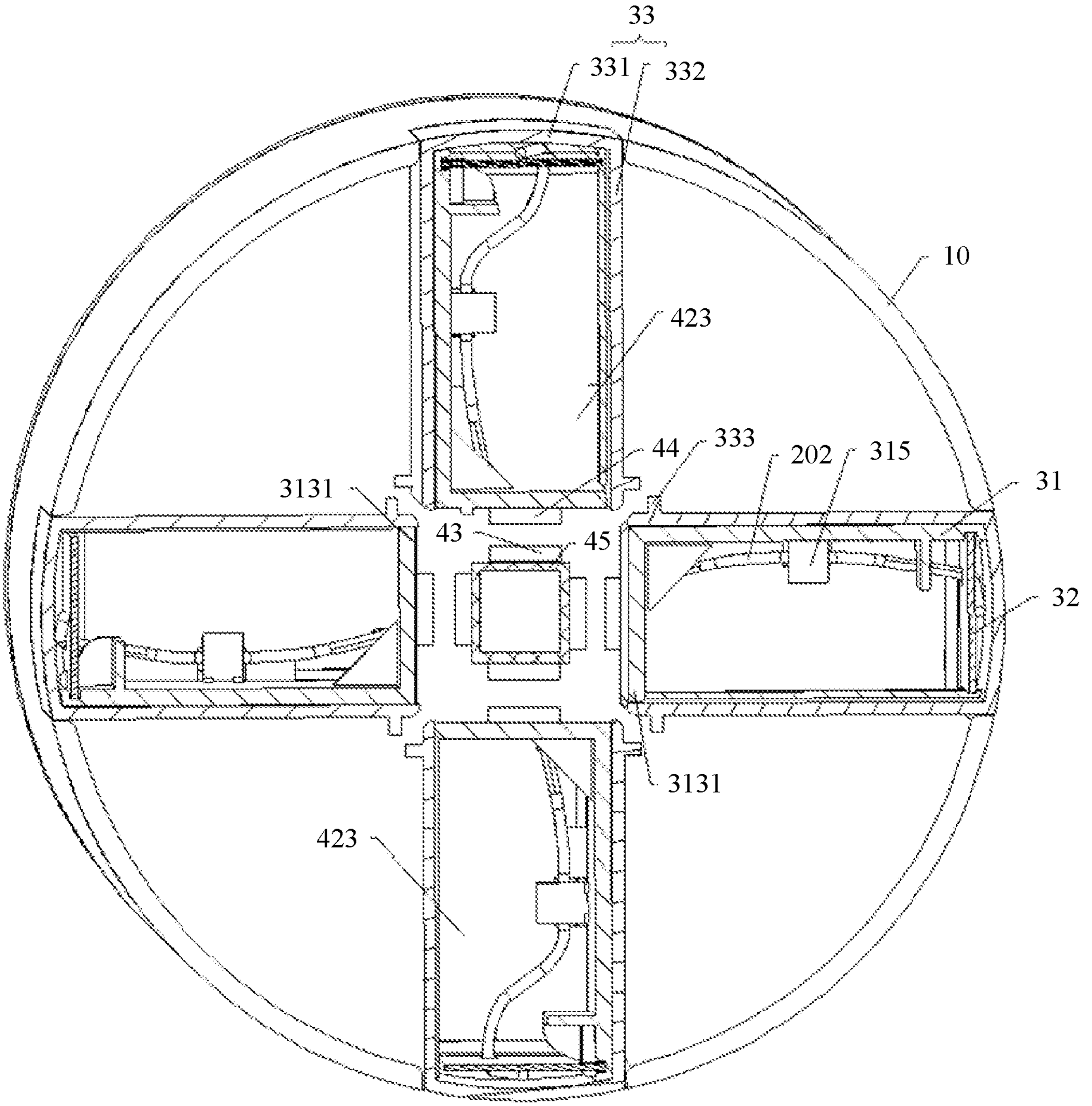
FIG. 11 is a sectional view of a wireless data terminal along a direction II-II in FIG. 1 according to another implementation of this application.

In some implementations, the drive assembly 40 may also be another structure. FIG. 11 is a sectional view of a wireless data terminal 100 along a direction II-II according to another implementation of this application. In this implementation, a drive assembly 40 includes a plurality of first magnetic attraction components 43 and a plurality of second magnetic attraction components 44 that are in a one-to-one correspondence with the plurality of first magnetic attraction components 43. Each second magnetic attraction component 44 is fastened to one end that is of an antenna assembly 30 and that is away from an outer side of a housing 10, and the first magnetic attraction component 43 is located on one side that is at the corresponding second magnetic attraction component 44 and that is away from the antenna assembly 30 on which the second magnetic attraction component 44 is located. The first magnetic attraction component 43 may be an electromagnet, and the second magnetic attraction component 44 may be a permanent magnet or an iron block. In this implementation, the second magnetic attraction component 44 is a permanent magnet. The drive assembly 40 further includes a mounting bracket 45. All the plurality of first magnetic attraction components 43 are fastened to the mounting bracket 45, so that the first magnetic attraction components 43 are carried by using the mounting bracket 45.

The first magnetic attraction component 43 includes a first state and a second state. When the first magnetic attraction component 43 is in the first state, the first magnetic attraction component 43 attracts the corresponding second magnetic attraction component 44; or when the first magnetic attraction component 43 is in the second state, the first magnetic attraction component 43 repels the corresponding second magnetic attraction component 44. Specifically, that the first magnetic attraction component 43 is in the first state means that after the electromagnet is powered on, a direction of a magnetic pole that is toward an end of the second magnetic attraction component 44 is opposite to a direction of a magnetic pole that is of the second magnetic attraction component 44 and that is toward an end of the first magnetic attraction component 43. Therefore, the first magnetic attraction component 43 can attract the corresponding second magnetic attraction component 44, and the second magnetic attraction component 44 approaches the first magnetic attraction component 43. The second magnetic attraction component 44 approaches the first magnetic attraction component 43 to drive the antenna assembly 30 to retract relative to the housing 10. That the first magnetic attraction component 43 is in the second state means that after the electromagnet is powered on, a direction of a magnetic pole that is toward an end of the second magnetic attraction component 44 is the same as a direction of a magnetic pole that is of the second magnetic attraction component 44 and that is toward an end of the first magnetic attraction component 43, so that the first magnetic attraction component 43 repels the corresponding second magnetic attraction component 44, and the second magnetic attraction component 44 moves away from the first magnetic attraction component 43. The second magnetic attraction component 44 is away from the first magnetic attraction component 43, to drive the antenna assembly 30 to extend out of the housing 10. In this implementation, the first magnetic attraction component 43 and the second magnetic attraction component 44 attract and repel each other, to implement extending or retracting of the antenna assembly 30. Therefore, a structure is simple, and energy consumption is low.

In some implementations, a limiting protrusion 333 is disposed on an antenna housing 33 of the antenna assembly 30, and the limiting protrusion 333 is located on a side that is of a side wall 332 and that is away from a bottom wall 331. When the antenna assembly 30 extends out of the housing 33 to a maximum extent, the limiting protrusion 333 abuts against an edge of a through hole 114 of the housing 10, and is in contact with an inner wall of the housing 10, to prevent the antenna assembly 30 from being detached from the housing 10 under a repulsion force between the first magnetic attraction component 43 and the second magnetic attraction component 44.

Figure 12:
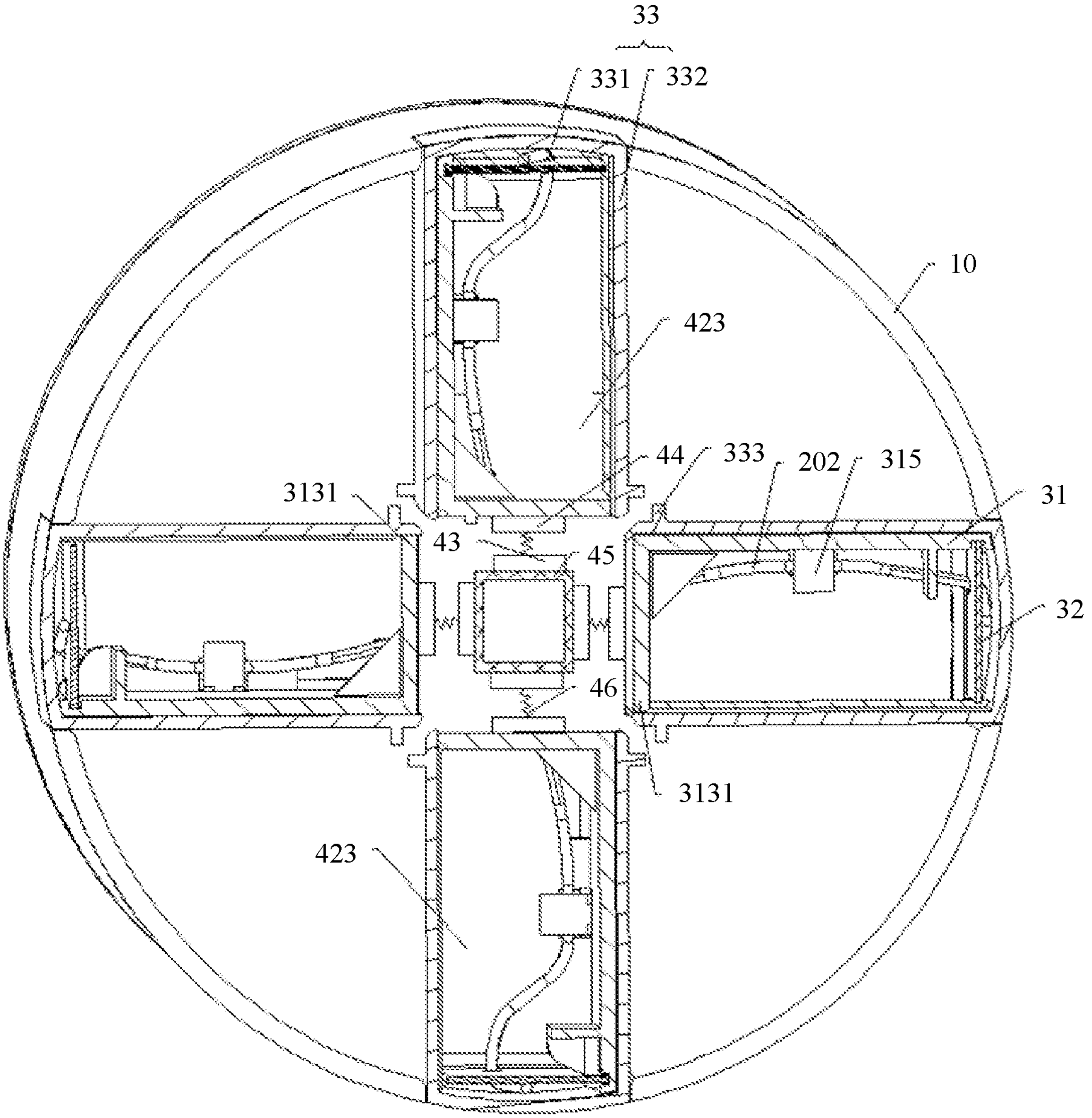
FIG. 12 is a sectional view of a wireless data terminal along a direction II-II in FIG. 1 according to some other implementations of this application.

FIG. 12 is a sectional view of a wireless data terminal 100 along a direction II-II according to some other implementations of this application. A difference between the implementation and the implementation shown in FIG. 10 lies in that the second magnetic attraction component 44 is an iron block, and an elastic component 46 such as a spring or elastic foam is connected between the first magnetic attraction component 43 and the second magnetic attraction component 44. When the elastic component 46 is in a natural extension state, the second magnetic attraction component 44 is away from the first magnetic attraction component 43, and the antenna assembly 30 extends out of the housing 10. In this implementation, a first state of the first magnetic attraction component 43 is a state in which the first magnetic attraction component 43 is powered on and is electromagnetic. In this case, the first magnetic attraction component 43 can attract the second magnetic attraction component 44, and the second magnetic attraction component 44 approaches the first magnetic attraction component 43 to drive the antenna assembly 30 to retract relative to the housing 10. A second state of the first magnetic attraction component 43 is a state in which the first magnetic attraction component 43 is powered off and is not electromagnetic. In this case, there is no magnetic force between the first magnetic attraction component 43 and the second magnetic attraction component 44. The second magnetic attraction component 44 is away from the first magnetic attraction component 43 under an elastic force of the elastic component 4645. The second magnetic attraction component 44 is away from the first magnetic attraction component 43 to drive the antenna assembly 30 to extend out of the housing 10

Alternatively, in some implementations, the drive assembly 40 includes a spring. One end of the spring is connected to the antenna housing 33 of the antenna assembly 30, and the other end of the spring is fastened in the housing 10. A first fastening part is disposed on the housing 10, and a second fastening part is disposed on the antenna housing 33. In a natural state, the spring is in a natural extension state. In this case, the antenna assembly 30 extends out of the housing 10 under push of the spring. When the antenna assembly 30 needs to retract in the housing 10, the antenna assembly 30 is pressed to make the spring in a contracted state, and the first fastening part and the second fastening part are clamped or magnetically fastened, so that the antenna assembly 30 retracts in the housing 10. In this implementation, a drive assembly 40 does not include a drive part 41, so that energy is saved. In addition, the drive assembly 40 has a simple structure, so that a volume of the wireless data terminal 100 can be smaller, and an assembly process of the wireless data terminal 100 can be simpler.

In this implementation of this application, the drive assembly 40 drives the antenna assembly 30 to extend out of or retract in the housing 10, that is, when the wireless data terminal 100 does not need to be used or high isolation between antennas is not required (e.g., a small signal coverage area is required), the antenna assembly 30 may be driven to retract to the first location, so that a volume occupied by the wireless data terminal 100 is reduced, and the wireless data terminal 100 has a good appearance effect. When high isolation between the antennas is required (e.g., a large signal coverage area is required), the antenna assemblies 30 may be driven to extend out of the housing 10 in different directions. In this case, when the plurality of antenna assemblies 30 extend out of the housing 10, a distance between the antennas is increased, so that a requirement of isolation between the antennas is met.

Figure 13:
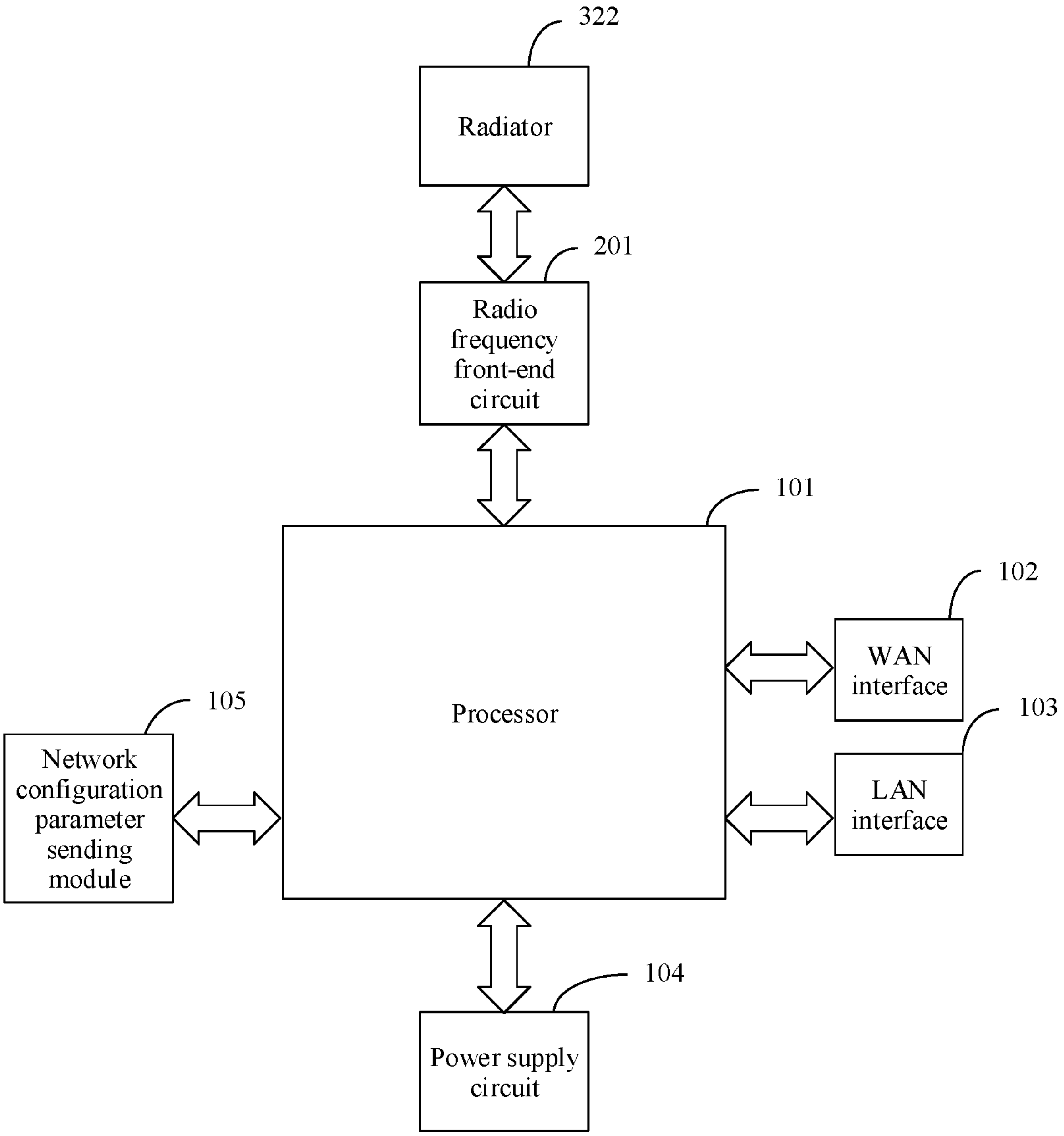
FIG. 13 is a schematic diagram of internal modules of a wireless data terminal according to some implementations of this application.

FIG. 13 is a schematic diagram of internal modules of a wireless data terminal 100 according to some implementations of this application. In implementations of this application, the wireless data terminal 100 further includes a processor 101, and both a radio frequency front-end circuit 201 and a drive assembly 40 of the wireless data terminal 100 are connected to the processor 101. In implementations of this application, the radio frequency front-end circuit 201 is connected to a radiator 322. The radiator 322 can receive a control signal and transmit the control signal to the radio frequency front-end circuit 201. The radio frequency front-end circuit 201 processes the control signal and transmits the control signal to the processor 101. The processor sends a control instruction to the drive assembly 40 in response to the control signal. The drive assembly drives, in response to the control instruction, an antenna assembly 40 to extend or retract relative to the housing 10, to adjust isolation between antennas.

In some implementations, the wireless data terminal 100 further includes a wide area network (WAN) interface 102, a local area network (LAN) interface 103, and a power supply circuit 104. The WAN interface 102 is an external network interface and is configured to connect to an external network. The LAN interface 1005 is an internal network interface and is configured to connect to a terminal device such as a computer. The power supply circuit 104 is configured to supply power to a component such as the processor 101. The WAN interface 102, the LAN interface 103, and the power supply circuit 104 are all connected to the processor 101. In some implementations, the processor 101, the WAN interface 102, the LAN interface 103, and the power supply circuit 104 may all be disposed on the mainboard 20.

In some implementations, the wireless data terminal 100 further includes a network configuration parameter sending module 105, and the network configuration parameter sending module 105 is connected to the processor 101. The network configuration parameter sending module 105 is configured to send network configuration parameters such as a service set identifier (SSID) and a password, to implement a communication connection between the wireless data terminal 100 and a control terminal. In some implementations of this application, the network configuration parameter sending module 105 may be a short-range wireless transmission module. For example, the network configuration parameter sending module 105 may be a short-range wireless transmission module such as an infrared transmitter, a light wave transmitter, a sound wave transmitter, a Bluetooth module, a wireless local area network 802.11 (Wi-Fi) module, or a near field communication (NFC) module. In this implementation, the network configuration parameter sending module 105 is a Wi-Fi module, the network configuration parameter sending module 105 is connected to the radio frequency front-end circuit 201, and can send the network configuration parameter through the radio frequency front-end circuit 201 and the radiator 322, to implement the communication connection between the wireless data terminal 100 and the control terminal. In some implementations, the wireless data terminal 100 further includes a memory, and the memory is connected to the processor 101 and is configured to store data. In some implementations, the network configuration parameter sending module 105 is connected to the memory. A network configuration parameter that is set by a user by using a control interface is processed by the processor 101 and then stored in the memory. The network configuration parameter sending module 105 obtains the network configuration parameter from the memory and sends the network configuration parameter.

Figure 14:
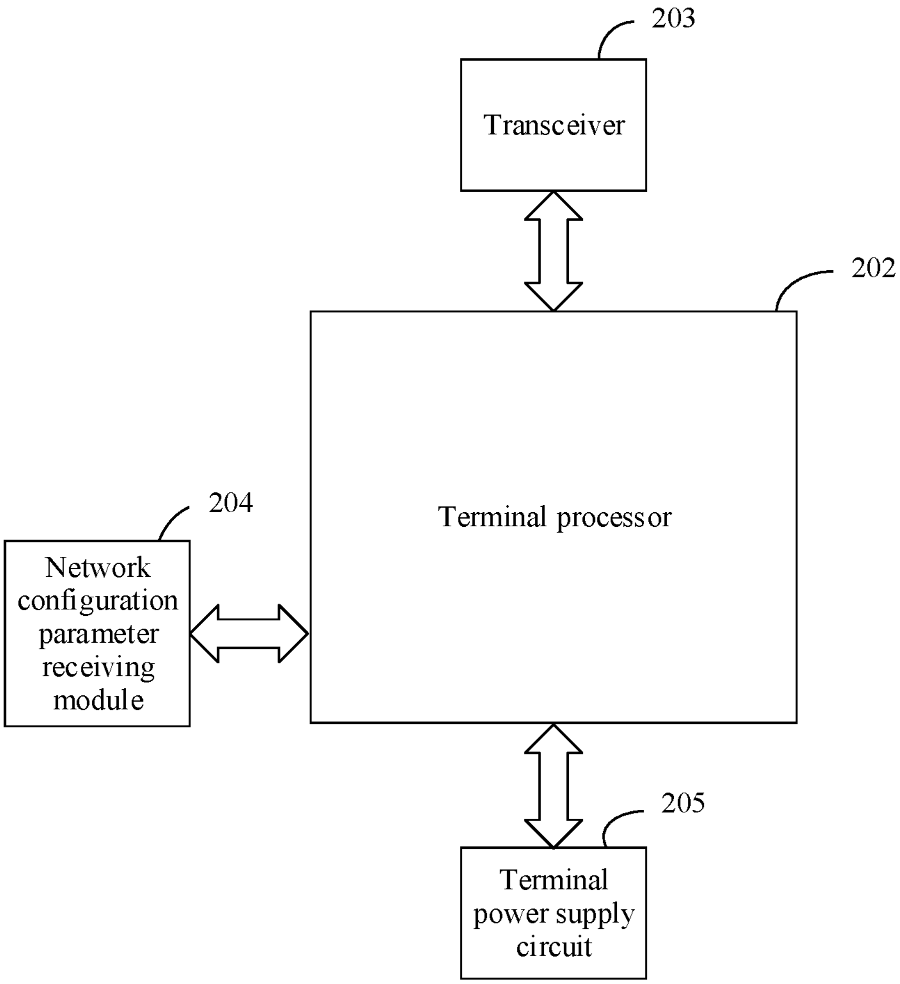
FIG. 14 is a schematic diagram of a structure of a wireless data terminal control system.

This application further provides a wireless data terminal control system. FIG. 14 is a schematic diagram of a structure of the wireless data terminal control system. The control system includes a wireless data terminal 100 and a control terminal 200 that performs a communication connection with the wireless data terminal 100. The control terminal 200 can control an antenna unit 30 of the wireless data terminal 100 to extend or retract relative to a housing 10. The control terminal 200 may be a terminal such as a mobile phone, a tablet, or a computer. FIG. 15 is a schematic diagram of structures of functional modules of the control terminal 200. The control terminal 200 includes a terminal processor 202 and a transceiver (transmitter and/or receiver, T/R) 203 connected to the terminal processor 202. The terminal processor is configured to send the control signal through the transceiver in response to an operation instruction of a user, to control the antenna assembly 30 of the wireless data terminal 100 to extend or retract relative to the housing 10.

In some implementations, the control terminal 200 further includes a network configuration parameter receiving module 204, a terminal power supply circuit 205, and the like. The terminal power supply circuit 205 and the network configuration parameter receiving module 204 are configured to receive a network configuration parameter sent by the wireless data terminal 100. The network configuration parameter receiving module 204 is a signal transmission module that matches a network configuration parameter sending module 105 of the wireless data terminal 100. For example, in some implementations of this application, both the network configuration parameter sending module 105 and the network configuration parameter receiving module 204 are Wi-Fi modules. In this implementation, the network configuration parameter sending module 105 is a Wi-Fi module. The network configuration parameter receiving module 204 is connected to the transceiver 202, and can receive the network configuration parameter through the transceiver 202, to implement the communication connection between the wireless data terminal 100 and the control terminal.

In this application, that the control terminal 200 controls an antenna unit 30 of the wireless data terminal 100 to extend or retract relative to a housing 10 specifically includes the following steps:

Step 1: Establish a communication connection between the control terminal 200 and the wireless data terminal 100.

An operation interface corresponding to a network configuration operation of the wireless data terminal 100 on the control terminal 200 is opened, a corresponding network configuration operation is performed based on the operation interface, corresponding network configuration parameters such as an SSID and a password sent by the wireless data terminal 100 are obtained, and the wireless data terminal 100 is connected based on the network configuration parameters such as the SSID and the password.

Step 2: Open an application (APP) corresponding to control of the wireless data terminal 100 on the control terminal 200, and control an operation interface of the application based on a requirement, to control the antenna unit 30 of the wireless data terminal 100 to extend or retract relative to the housing 10.

FIG. 16 is a flowchart of a control method of the wireless data terminal 100. The control method of the wireless data terminal 100 specifically includes the following steps:

S1: Control an operation interface of the application, where the terminal processor 202 sends a control signal through the transceiver 203 in response to an operation instruction of a user.

Figure 17:
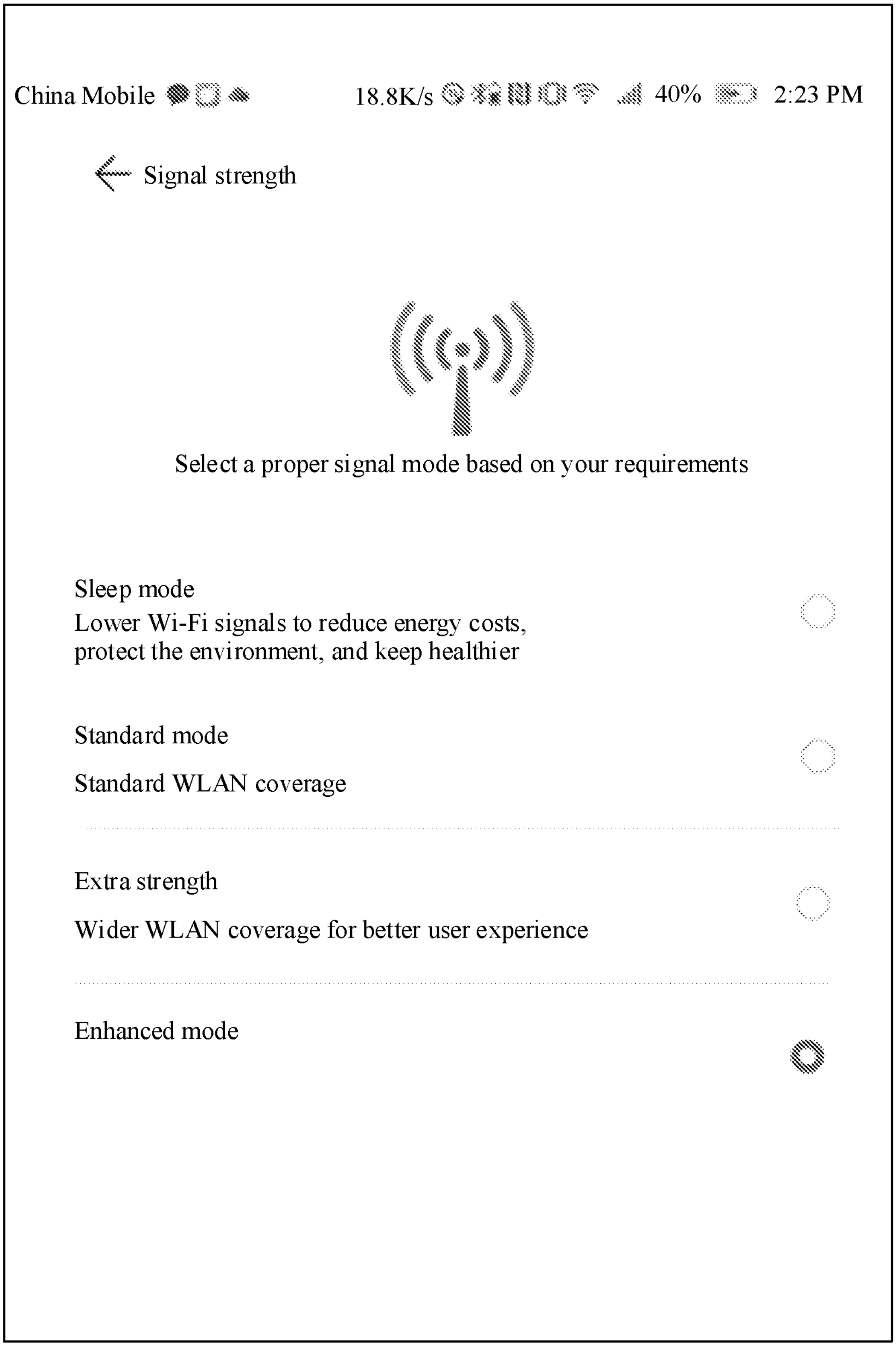
FIG. 17 is a diagram of an operation interface of an application when an antenna assembly is controlled to extend out of a housing according to an implementation of this application.

For example, FIG. 17 is a diagram of an operation interface of an application when an antenna assembly 30 is controlled to extend out of a housing 10 according to an implementation of this application. When radio frequency signal strength of the wireless data terminal 100 is poor, and the antenna assembly 30 needs to be driven to extend out of the housing 10, an "enhanced mode" on the operation interface of the application is clicked. In this case, the terminal processor 202 sends the first control signal by using the transceiver 203 in response to the operation instruction of the user.

Figure 18:
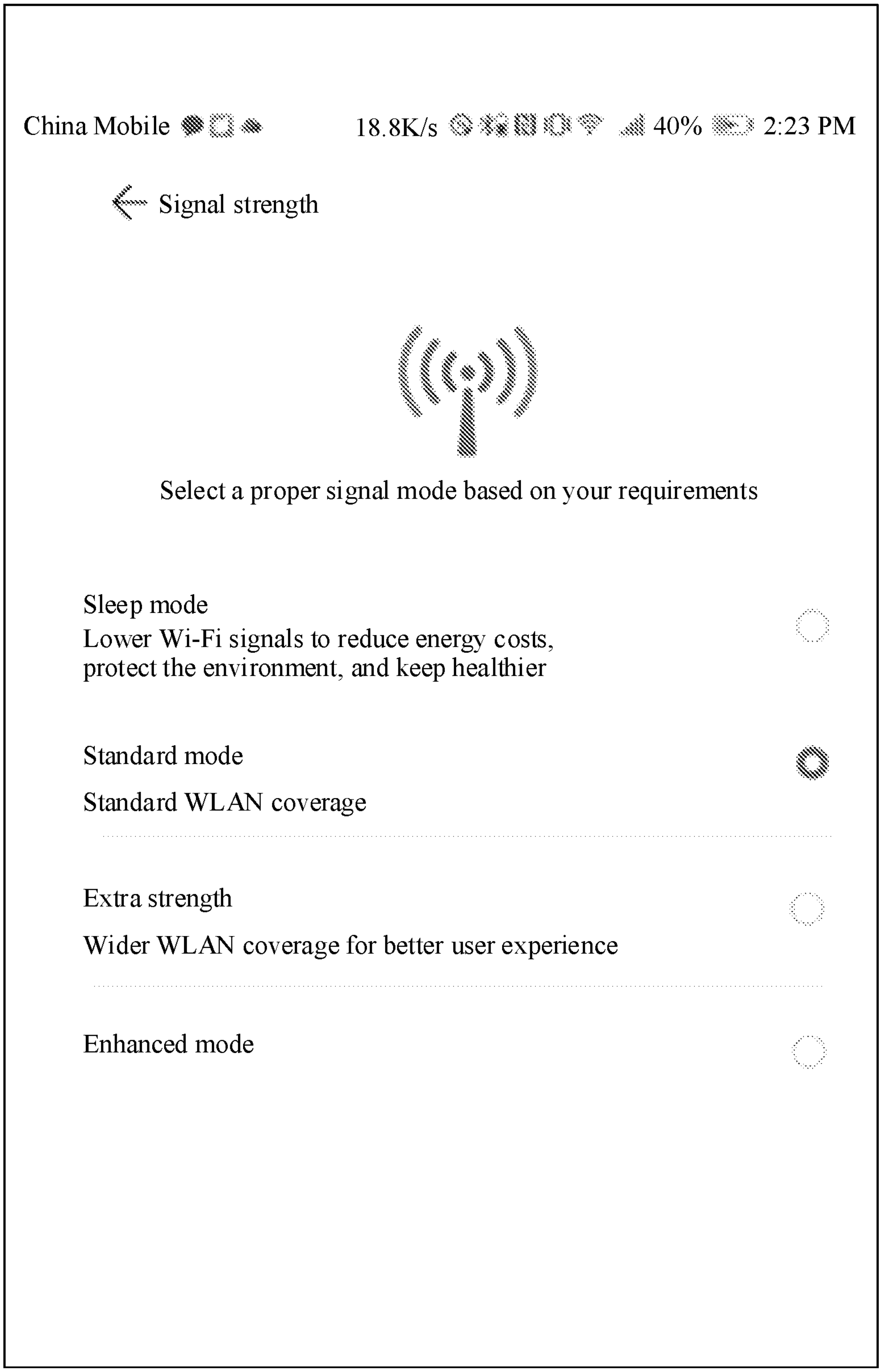
FIG. 18 is a diagram of an operation interface of an application when the antenna assembly is controlled to retract relative to the housing in the implementation shown in FIG. 17.

FIG. 18 is a diagram of an operation interface of the application when the antenna assembly 30 is controlled to retract relative to the housing 10 in the implementation shown in FIG. 17. When radio frequency signal strength of the wireless data terminal 100 is high, and it is expected that a volume occupied by the wireless data terminal 100 can be reduced or a complete appearance of the wireless data terminal 100 can be implemented, and it is required to drive the antenna assembly 30 to retract relative to the housing 10, a "standard mode" or a "sleep mode" is clicked. In this case, the wireless data terminal 100 is in a standard state or a sleep state, and the terminal processor 202 sends a second control signal through the transceiver 203 in response to an operation instruction of the user.

S2: A radiator 322 of the wireless data terminal 100 receives a control signal and transmits the control signal to a radio frequency front-end circuit 201.

S3: The radio frequency front-end circuit 201 processes the control signal and transmits the control signal to a processor 101 of the wireless data terminal 100.

S4: The processor 101 sends a control instruction to a drive assembly 40 in response to the control signal.

When the control signal received by the wireless data terminal 100 is the first control signal, the processor 101 sends a first control instruction to the drive assembly 40 in response to the first control signal; or when the control signal received by the wireless data terminal 100 is the second control signal, the processor 101 sends an second control instruction to the drive assembly 40 in response to the second control signal.

S5: The drive assembly 40 drives, in response to the control instruction, the antenna assembly 30 to extend or retract relative to the housing.

When the wireless data terminal 100 sends the first control instruction to the drive assembly 40, the drive assembly 40 drives the antenna assembly 30 to extend out of the housing 10, and a distance between antenna assemblies 30 is increased, so that isolation between antennas of the wireless data terminal 100 is increased, and signal interference between the antennas is reduced. Therefore, signal strength of the wireless data terminal 100 is improved, and strength of a radio frequency signal of the wireless data terminal 100 is improved. When the wireless data terminal 100 sends the second control instruction to the drive assembly 40, the drive assembly 40 drives the antenna assembly 30 to retract relative to the housing 10, and a distance between the antenna assemblies 30 is reduced, so that a volume occupied by the wireless data terminal 100 is reduced. When the antenna assembly 30 completely retracts in the housing 10, the wireless data terminal 100 has the complete appearance.

The foregoing descriptions are preferred implementations of this application. It should be noted that a person of ordinary skill in the art may make several improvements and polishing without departing from the principle of this application, and the improvements and polishing shall fall within the protection scope of this application.

What is claimed is:

1. A wireless data terminal, comprising:
a housing,
a drive assembly,
a first antenna assembly, and
a second antenna assembly;
wherein:
the drive assembly is accommodated in the housing,
the drive assembly is configured to drive the first antenna assembly and the second antenna assembly to extend or retract to move in different directions between a first position and a second position relative to the housing,
the first position is a maximum retracted position relative to the housing, and
the second position is a maximum extended position relative to the housing and;
wherein:
the first antenna assembly comprises a first radiator,
the second antenna assembly comprises a second radiator,
the first radiator and the second radiator are configured to transmit a radio frequency signal, and
a distance between the first radiator and the second radiator at the first position is less than a distance between the first radiator and the second radiator at the second position;
wherein an operating frequency band of the first antenna assembly is different from an operating frequency band of the second antenna assembly; and
wherein:
there are at least two first antenna assemblies,
a center of a pattern formed by connecting projections of the at least two first antenna assemblies on a reference plane is a first center,
the first center is located on a central axis of the housing,
an included angle $\alpha_1$ formed between connection lines between the first center and projections of two adjacent first antenna assemblies on the reference plane satisfies a relation: $\alpha_1=360°/N$, where N is a quantity of first antenna assemblies, and
the reference plane is perpendicular to the central axis of the housing.

2. The wireless data terminal according to claim 1, wherein:
there are at least two second antenna assemblies,
a center of a pattern formed by connecting projections of the at least two second antenna assemblies on the reference plane is a second center,
the second center is located on the central axis of the housing, and
an included angle $\alpha_2$ formed between connection lines between the second center and projections of two adjacent second antenna assemblies on the reference plane satisfies a relation: $\alpha_2=360°/M$, where M is a quantity of second antenna assemblies.

3. The wireless data terminal according to claim 2, wherein:
the quantity of first antenna assemblies is the same as the quantity of second antenna assemblies,
the first antenna assemblies and the second antenna assemblies are alternately disposed, and
angular rotational position differences from any first antenna assembly to two adjacent second antenna assemblies are the same.

4. The wireless data terminal according to claim 3, wherein:
the quantity of first antenna assemblies and the quantity of second antenna assemblies are both two,
the two first antenna assemblies are symmetrically disposed relative to the central axis of the housing,
the two second antenna assemblies are symmetrically disposed relative to the central axis of the housing, and
a connection line between the two first antenna assemblies is perpendicular to a connection line between the two second antenna assemblies.

5. The wireless data terminal according to claim 1, wherein:
the housing comprises a tubular main housing,
a plurality of through holes are disposed on the main housing,
the plurality of through holes are arranged at intervals along a circumferential direction of the main housing, and
each through hole is connected to an inner side and an outer side of the main housing;
wherein the drive assembly is located on the inner side of the main housing, and
wherein the drive assembly is configured to drive the first antenna assembly and the second antenna assembly to extend or retract relative to each other through the plurality of through holes in a one-to-one correspondence manner.

6. The wireless data terminal according to claim 1, wherein the drive assembly comprises a motor, a gear, and a plurality of racks;
wherein one end of each rack is fastened to the first antenna assembly,
wherein different racks, of the plurality of racks, are engaged with different locations on the gear,
wherein the different racks have different extension directions, and
wherein an extension direction of each rack, of the plurality of racks, is a direction from an end that is of the rack and that is away from the first antenna assembly to an end that is of the rack and that is connected to the first antenna assembly.

7. The wireless data terminal according to claim 1, wherein the drive assembly comprises a motor, a gear, and a plurality of racks;
wherein one end of each rack is fastened to the second antenna assembly,
wherein different racks, of the plurality of racks, are engaged with different locations on the gear,
wherein the different racks have different extension directions, and
wherein an extension direction of each rack, of the plurality of racks, is a direction from an end that is of the rack and that is away from the second antenna assembly to an end that is of the rack and that is connected to the second antenna assembly.

8. The wireless data terminal according to claim 1, wherein the drive assembly comprises a plurality of motors, a plurality of gears, and a plurality of racks;
wherein each motor is connected to at least one gear,
wherein each gear is engaged with and connected to at least one rack, wherein one end of each rack is fastened to the first antenna assembly, wherein different racks have different extension directions, and wherein an extension direction of each rack is a direction from an end that is of the rack and that is away from the first antenna assembly to an end that is of the rack and that is connected to the first antenna assembly.

9. The wireless data terminal according to claim 1, wherein the drive assembly comprises a plurality of motors, a plurality of gears, and a plurality of racks;

wherein each motor is connected to at least one gear, wherein each gear is engaged with and connected to at least one rack, wherein one end of each rack is fastened to the second antenna assembly, wherein different racks have different extension directions, and wherein an extension direction of each rack is a direction from an end that is of the rack and that is away from the second antenna assembly to an end that is of the rack and that is connected to the second antenna assembly.

10. The wireless data terminal according to claim 1, wherein the drive assembly comprises a plurality of first magnetic attraction components and a plurality of second magnetic attraction components that are in a one-to-one correspondence with the plurality of first magnetic attraction components, wherein each second magnetic attraction component is fastened to one end that is of the first antenna assembly and that is away from an outer side of the housing, wherein the first magnetic attraction component is located on a side that is of a corresponding second magnetic attraction component and that is away from the outer side of the housing; and wherein the first magnetic attraction component comprises a first state and a second state, such that when the first magnetic attraction component is in the first state, the first magnetic attraction component attracts the corresponding second magnetic attraction component; and when the first magnetic attraction component is in the second state, the first magnetic attraction component repels the corresponding second magnetic attraction component.

11. The wireless data terminal according to claim 1, wherein the drive assembly comprises a plurality of first magnetic attraction components and a plurality of second magnetic attraction components that are in a one-to-one correspondence with the plurality of first magnetic attraction components, wherein each second magnetic attraction component is fastened to one end that is of the second antenna assembly and that is away from an outer side of the housing, wherein the first magnetic attraction component is located on a side that is of a corresponding second magnetic attraction component and that is away from the outer side of the housing; and wherein the first magnetic attraction component comprises a first state and a second state, such that when the first magnetic attraction component is in the first state, the first magnetic attraction component attracts the corresponding second magnetic attraction component; when the first magnetic attraction component is in the second state, the first magnetic attraction component repels the corresponding second magnetic attraction component.

12. The wireless data terminal according to claim 1, wherein the first antenna assembly comprises a first antenna bracket and a first antenna body, wherein the first radiator is disposed on the first antenna body, wherein the first antenna body is mounted on a side that is of the first antenna bracket and that is away from a central axis of the housing;

wherein the second antenna assembly comprises a second antenna bracket and a second antenna body, wherein the second radiator is disposed on the second antenna body, and wherein the second antenna body is mounted on a side that is of the second antenna bracket and that is away from the central axis of the housing.

13. The wireless data terminal according to claim 12, wherein both the first antenna body and the second antenna body are parallel to the central axis of the housing.

14. The wireless data terminal according to claim 12, wherein the first antenna assembly further comprises a first antenna housing, wherein both the first antenna bracket and the first antenna body are accommodated in the first antenna housing;

wherein the first antenna housing comprises a first bottom wall and a first side wall disposed around an edge of the first bottom wall, such that when the first antenna assembly is positioned at the first position, an outer surface of the first bottom wall and an outer surface of the housing are coplanar;

wherein the second antenna assembly further comprises a second antenna housing, and wherein both the second antenna bracket and the second antenna body are accommodated in the second antenna housing; and wherein the second antenna housing comprises a second bottom wall and a second side wall disposed around an edge of the second bottom wall, such that when the second antenna assembly is positioned at the first position, an outer surface of the second bottom wall and the outer surface of the housing are coplanar.

15. The wireless data terminal according to claim 13, wherein the first antenna assembly further comprises a first antenna housing, wherein both the first antenna bracket and the first antenna body are accommodated in the first antenna housing;

wherein the first antenna housing comprises a first bottom wall and a first side wall disposed around an edge of the first bottom wall, such that when the first antenna assembly is positioned at the first position, an outer surface of the first bottom wall and an outer surface of the housing are coplanar; and wherein the second antenna assembly further comprises a second antenna housing, wherein both the second antenna bracket and the second antenna body are accommodated in the second antenna housing;

wherein the second antenna housing comprises a second bottom wall and a second side wall disposed around an edge of the second bottom wall, such that when the second antenna assembly is positioned at the first position, an outer surface of the second bottom wall and the outer surface of the housing are coplanar.

16. The wireless data terminal according to claim 12, wherein the wireless data terminal further comprises a mainboard and a feeder, wherein the mainboard comprises a radio frequency front-end circuit, wherein the feeder is electrically connected to the radio frequency front-end circuit and the radiator, wherein a fastener is disposed in each of the first antenna bracket and the second antenna bracket, and wherein the fastener is configured to fasten the feeder to the first antenna bracket.

17. The wireless data terminal according to claim 12, wherein the wireless data terminal further comprises a mainboard and a feeder, wherein the mainboard comprises a radio frequency front-end circuit, wherein the feeder is electrically connected to the radio frequency front-end circuit and the radiator;

wherein a fastener is disposed in each of the first antenna bracket and the second antenna bracket, and wherein the fastener is configured to fasten the feeder to the second antenna bracket.

18. The wireless data terminal according to claim 1, wherein the wireless data terminal further comprises a bearing bracket that is accommodated in the housing, wherein the drive assembly, the first antenna assembly, and the second antenna assembly are all disposed on the bearing bracket;

wherein the bearing bracket comprises a plurality of grooves that are in a one-to-one correspondence with the first antenna assemblies and the second antenna assemblies, wherein an extension direction of the groove is the same as a movement direction of a corresponding first antenna assembly or a corresponding second antenna assembly, wherein the extension direction of the groove is a direction from an end that is of the groove and that is away from an outer side of the housing to an end that is of the groove and that is close to the outer side of the housing; and wherein the first antenna assembly and the second antenna assembly are at least partially accommodated in the groove and extend or retract along the groove.

19. The wireless data terminal according to claim 1, wherein the wireless data terminal further comprises a processor and a radio frequency front-end circuit, wherein both the radio frequency front-end circuit and the drive assembly are connected to the processor, and wherein the radio frequency front-end circuit is connected to the first radiator and the second radiator;

wherein the first radiator and the second radiator are configured to:

receive a control signal, and transmit the control signal to the radio frequency front-end circuit;

wherein the radio frequency front-end circuit is configured to:

process the control signal, and transmit the control signal to the processor;

wherein the processor is configured to send a control instruction to the drive assembly in response to the control signal; and wherein the drive assembly is configured to drive, in response to the control instruction, the first antenna assembly and the second antenna assembly to extend or retract relative to the housing.

20. A wireless data terminal control system, comprising a control terminal and the wireless data terminal according to claim 19, wherein:

the control terminal comprises a terminal processor and a transceiver, and the terminal processor is connected to the transceiver; and the terminal processor is configured to send the control signal through the transceiver in response to an operation instruction of a user.

* * * * *